(12) United States Patent
Sudo et al.

(10) Patent No.: US 9,415,595 B2
(45) Date of Patent: Aug. 16, 2016

(54) RECORDING METHOD AND INK JET PRINTER

(71) Applicant: Seiko Epson Corporation, Tokyo (JP)

(72) Inventors: Naoki Sudo, Shiojiri (JP); Akito Sato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/636,438

(22) Filed: Mar. 3, 2015

(65) Prior Publication Data

US 2015/0258785 A1    Sep. 17, 2015

(30) Foreign Application Priority Data

Mar. 17, 2014  (JP) .................................. 2014-053841

(51) Int. Cl.
  *B41J 2/21*      (2006.01)
  *B41J 2/14*      (2006.01)
  *H04N 1/60*      (2006.01)

(52) U.S. Cl.
  CPC  *B41J 2/1433* (2013.01); *B41J 2/21* (2013.01); *B41J 2/2139* (2013.01); *H04N 1/6022* (2013.01); *G06K 2215/00* (2013.01)

(58) Field of Classification Search
  CPC ........ B41J 2/0451; B41J 2/165; B41J 2/2132; B41J 2/216579; B41J 2/2135; B41J 2/2139
  See application file for complete search history.

(56) References Cited

U.S. PATENT DOCUMENTS 5,581,284 A  *  12/1996  Hermanson ..........  B41J 2/04505
                                                        347/40

FOREIGN PATENT DOCUMENTS

JP           2003-320661 A       11/2003

* cited by examiner

*Primary Examiner* — Geoffrey Mruk

(57) ABSTRACT

A recording method in which dot omission pixels that are contiguous in a scanning direction due to defective nozzles included in a plurality of black nozzles and neighboring pixels that neighbor the dot omission pixels in a direction that intersects the scanning direction are included in a plurality of pixels that configure the printed image; and black ink droplets that form black dots for complement are discharged from the black nozzles to the neighboring pixels along with discharging color ink droplets that form the composite black dots for complement on the dot omission pixels from color nozzles when complementing the dots due to the defective nozzles.

6 Claims, 18 Drawing Sheets

CASE WHERE $Cp = 7 \times Yp - |\delta|$ ($\delta < 0$)

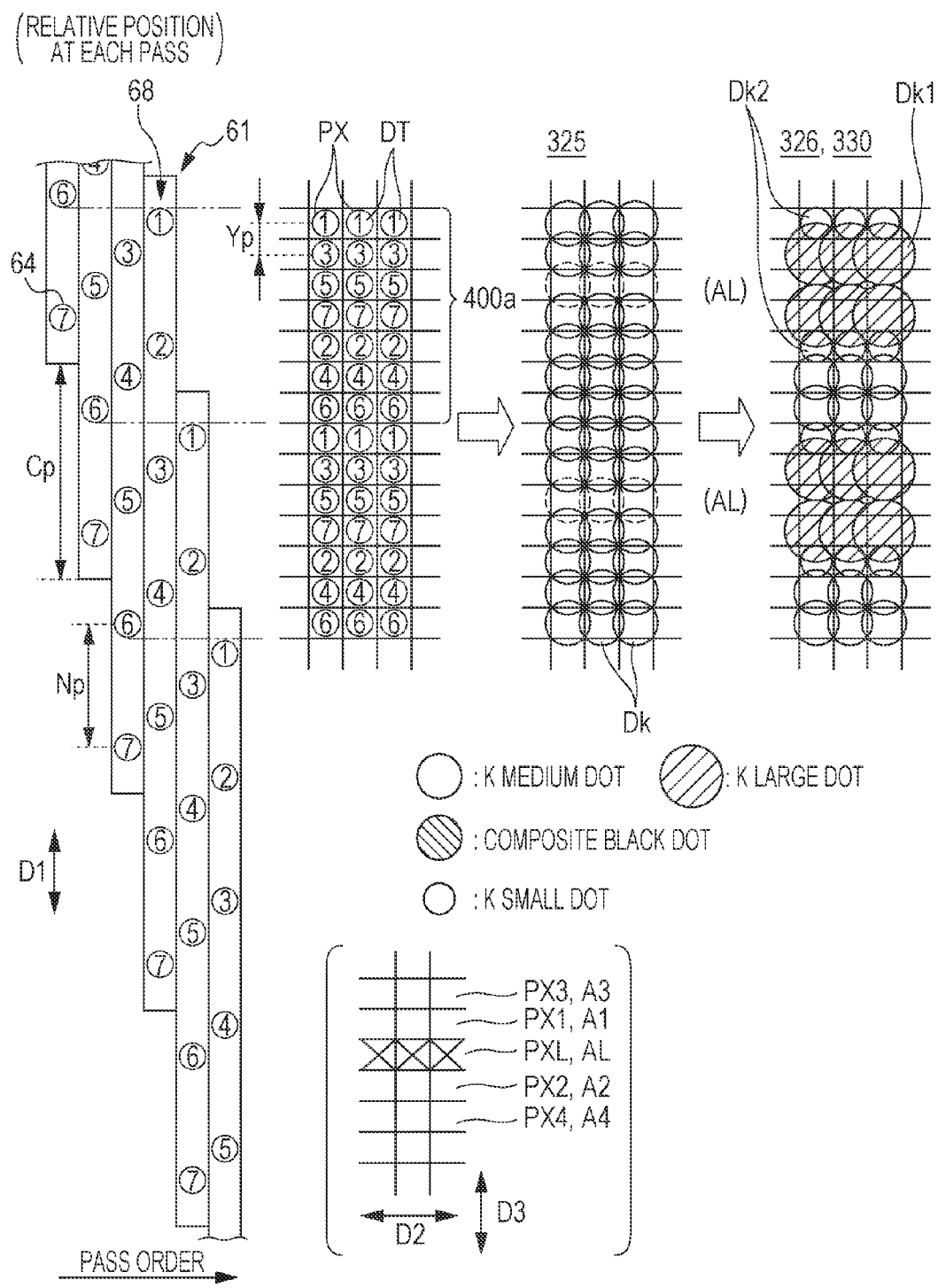

CASE WHERE $Cp = 7 \times Yp + \delta\ (\delta > 0)$

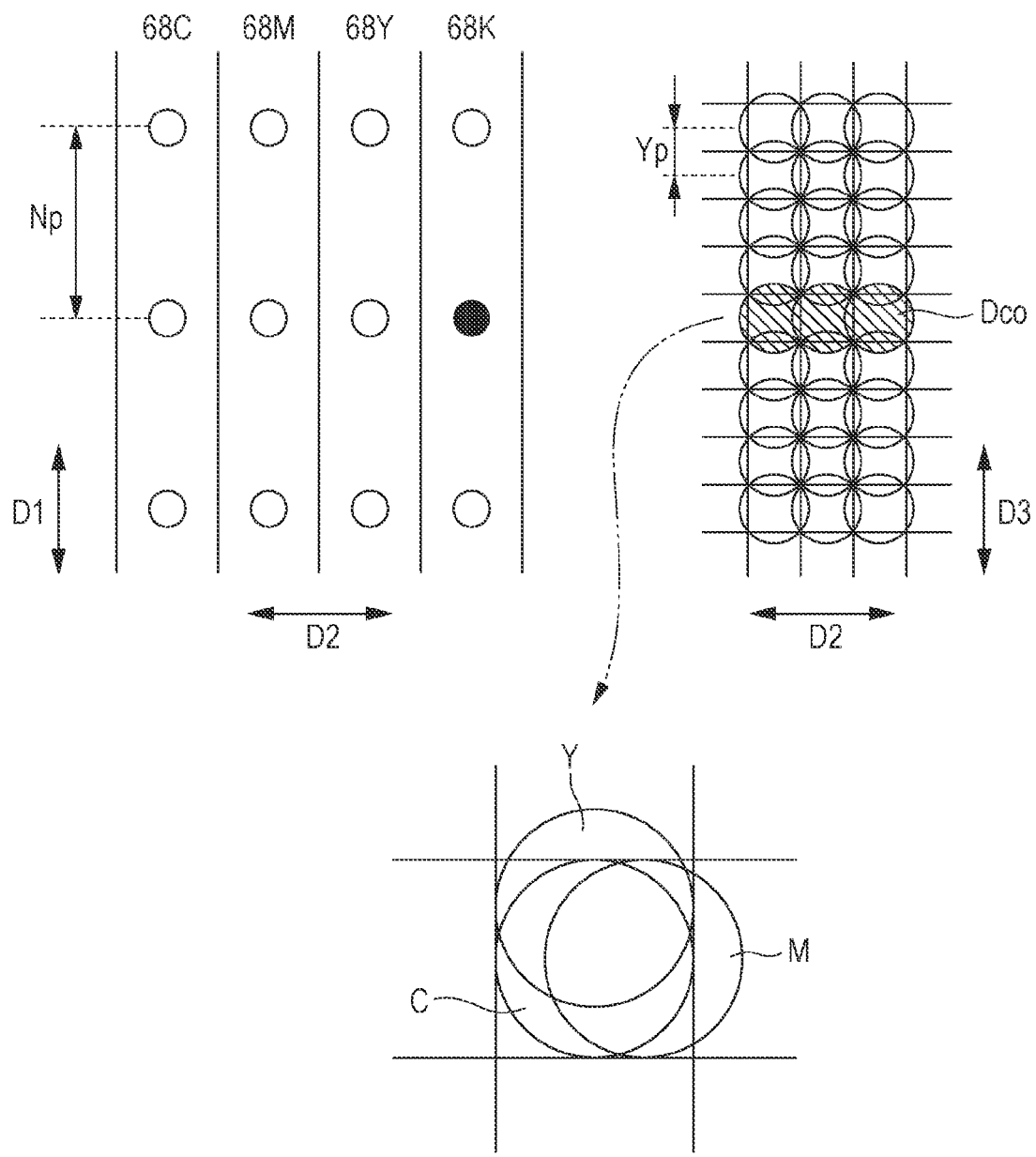

RECORDING METHOD AND INK JET PRINTER

CROSS-REFERENCE TO RELATED APPLICATIONS

This application claims priority to Japanese Patent Application No. 2014-053841 filed on Mar. 17, 2014. The entire disclosure of Japanese Patent Application No. 2014-053841 is hereby incorporated herein by reference.

BACKGROUND

1. Technical Field

The present invention relates to a recording method and an ink jet printer.

2. Related Art

The ink jet printer forms, for example, dots on a printing material by a plurality of nozzles lined up in a predetermined nozzle arrangement direction and the printing material being relatively moved in a scanning direction orthogonal to the nozzle arrangement direction, and ink droplets being discharged from the nozzles in accordance with recording data indicating the presence or absence of dots for each pixel. As the printing method, there is interlace printing or the like in which ink droplets discharged from adjacent nozzles in the nozzle arrangement direction are landed on non-adjacent pixels in the transport direction, and ink droplets are landed with respect to pixels between positions on which ink droplets are temporally not landed at a later pass (main scanning) (JP-A-2003-320661).

When the ink droplets are not discharged from the nozzles due to clogging or the like, or the discharged ink droplets do not trace the correct path, a "missing dot" region in which pixels on which dots are not formed are connected is formed, and stripes of the base color of the printing material, such as white stripes" arise in the printed image. In particular, when there is a defective nozzle, in which the discharging of the ink droplets is defective, in the K (black) nozzles, there is a tendency for the stripes of the base color of the printing material to be noticeable. Because interlace printing forms dots of adjacent pixels in the transport direction in different passes, the "missing dot" region may spread in the transport direction when there is an error in the paper feed amount. When the "missing dot" region spreads, the stripes of the base color of the printing material are easily noticed.

The ink jet printer disclosed in JP-A-2003-320661 is provided with a spare nozzle that are not used during normal printing at the end portion of the nozzle row, and ink droplets are discharged from the spare nozzles when the paper is transported in error more than the permitted amount. The technical concept of suppressing the noticeability of the stripes of the base color that occur in the printed image due to defective nozzles is not present in the technology disclosed in JP-A-2003-320661.

In a case of a defective nozzle being present in the K nozzles, forming composite black dots by discharging CMY ink droplets from each CMY (cyan, magenta, yellow) nozzle to the "missing dot" region in order to suppress the noticeability of the above-described stripes. However, it is difficult for each of the CMY dots to be completely superimposed, and colored stripes may be visible along the "missing dot" region. Because composite black dots appear lighter in color than single color black dots, a light stripe may be present along the "missing dot" region. This phenomenon easily arises in cases in which the printing method is interlace printing.

Problems such as the above are not limited to cases of interlace printing, and are similarly present in various ink jet printers.

SUMMARY

An advantage of some aspects of the invention is to provide a technology able to further suppress stripes arising in a printed image due to a defective nozzle in which the formation of a black dot is defective from being noticeable.

According to an aspect of the invention, there is provided a recording method in which a plurality of black nozzles that discharge black ink droplets lined up in an arrangement direction different to a scanning direction and a nozzle row group in which a plurality of color nozzles lined up in the scanning direction that discharge color ink droplets that generate composite black are lined up in the arrangement direction and a printing material are relatively moved in the scanning direction, thereby forming a printed image with the ink droplets, in which dot omission pixels that are contiguous in the scanning direction due to defective nozzles included in the plurality of black nozzles and neighboring pixels that neighbor the dot omission pixels in a direction that intersects the scanning direction are included in a plurality of pixels that configure the printed image, and black ink droplets that form black dots for complement are discharged from the black nozzles to the neighboring pixels along with discharging color ink droplets that form the composite black dots for complement on the dot omission pixels from the color nozzles when complementing the dots due to the defective nozzles.

According to another aspect of the invention, there is provided an ink jet printer in which a plurality of black nozzles that discharge black ink droplets lined up in an arrangement direction different to a scanning direction and a nozzle row group in which a plurality of color nozzles lined up in the scanning direction that discharge color ink droplets that generate composite black are lined up in the arrangement direction and a printing material are relatively moved in the scanning direction, thereby forming a printed image with the ink droplets, in which dot omission pixels that are contiguous in the scanning direction due to defective nozzles included in the plurality of black nozzles and neighboring pixels that neighbor the dot omission pixels in a direction that intersects the scanning direction are included in a plurality of pixels that configure the printed image, and black ink droplets that form black dots for complement are discharged from the black nozzles to the neighboring pixels along with discharging color ink droplets that form the composite black dots for complement on the dot omission pixels from the color nozzles when complementing the dots due to the defective nozzles.

That is, the black dots to be formed in the dot omission pixels are complemented by composite black dots formed in the dot omission pixel and black dots formed in the neighboring pixels. Since black ink droplets are used for the complementing, coloring of the stripes along the black dot omission pixels that are contiguous in the scanning direction is suppressed, and light stripes along the dot omission pixels are also suppressed. Accordingly, the aspect is able to provide a technology able to further suppress stripes arising in a printed image due to a defective nozzle in which the formation of a black dot is defective from being noticeable.

The invention is applicable to a composite device that includes an ink jet printer, an image forming program that causes a computer to realize functions corresponding to each of the above-described portions, a program, such as a printing program, that includes the image forming program, and a computer readable medium on which these programs are recorded and the like. The above-described device is preferably configured by a plurality of distributed parts.

BRIEF DESCRIPTION OF THE DRAWINGS

The invention will be described with reference to the accompanying drawings, wherein like numbers reference like elements.

FIG. 5 is a drawing schematically showing an example of an image formed when no error in the transport amount occurs.

FIG. 18 is a drawing schematically showing an example of forming an image in a comparative example.

DESCRIPTION OF EXEMPLARY EMBODIMENTS

Figure 1:
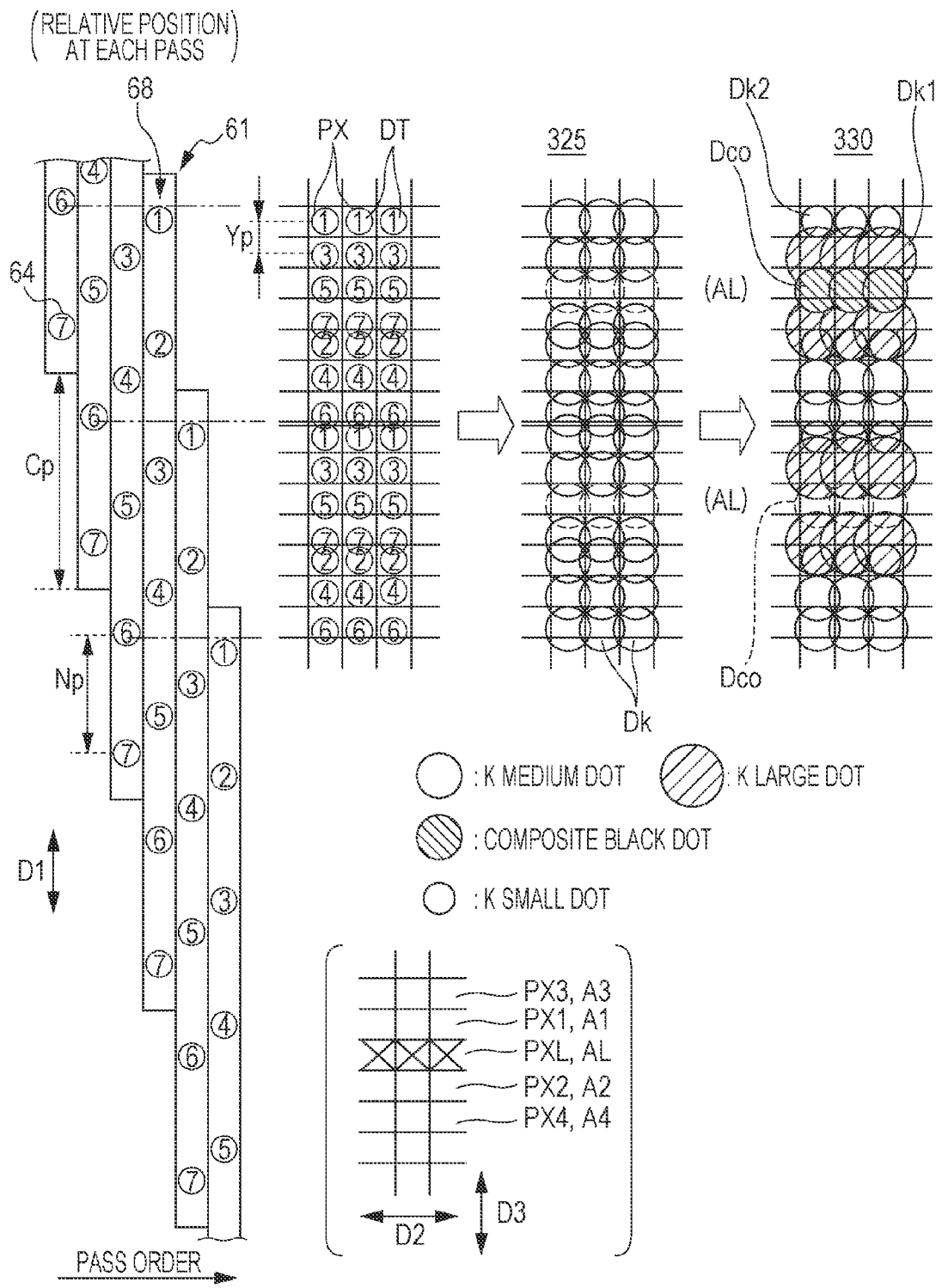
FIG. 1 is a drawing schematically showing an example of forming the composite black complementary dot on the dot omission pixel and K complementary dot on the neighboring pixel.

Below, embodiments of the invention will be described. Naturally, the following embodiments are merely examples of the invention, and there is no limitation that all of the characteristics shown in the embodiments be essential to the means of solving the problem of the invention.

(1) SUMMARY OF PRESENT TECHNOLOGY

Firstly, an outline of the present technology will be described with reference to FIGS. 1 to 18.

In the recording method of the present technology, a nozzle row group (head 61) in which a plurality of black nozzles 64K that discharge black (K) ink droplets lined up in an arrangement direction D1 different to the scanning direction D2 and a plurality of color nozzles (64C, 64M, 64Y) that discharge color ink droplets 67co that generate composite black line up in the arrangement direction D1 are lined up in the scanning direction D2 and a printing material 400 are relatively moved in the scanning direction D2, a printed image 330 is thereby formed with the ink droplets 67.

The color ink that generates the composite black also includes inks such as cyan (C), magenta (M), yellow (Y), light cyan (lc), light magenta (lm), dark yellow (DY), red (R), orange (Or), green (Gr), and violet (V). It is possible to use a mixed color of colors selected from these colors as the colors that generate the composite black, and even though a CMY mixed color is preferable, a color other than the CMY mixed color is preferably a CM mixed color or the like.

Relatively moving the nozzle row group and the printing material includes the nozzle row group moving without the printing material moving, the printing material moving without the nozzle row group moving, and both the nozzle row group and the printing material moving. The nozzles included in the nozzle row group are small holes that eject ink droplets. The discharge of an ink droplet being defective includes clogging which the phenomenon of the nozzle being blocked.

The printing material (print substrate) is a material that supports the printed image. Although the shape of a printing material is normally rectangular, there are also circular (optical disc, such as a CD-ROM or DVD), triangular, square, and polygonal printing materials, and all varieties and worked products of a paper board disclosed in at least JIS P0001:1998 (Paper, board and pulp—Vocabulary) are included. The printing material also includes resin sheets, metal sheets, and solid objects.

The plurality of pixels PX that configure the printed image 330 includes the dot omission pixels PXL that are contiguous in the scanning direction D2 due to a defective nozzle LN included in the plurality of black nozzles 64K, and neighboring pixels PX1 and PX2 (indicate at least one of PX1 and PX2. Same applies below) that neighbor the dot omission pixel PXL in a direction (transport direction D3) that intersects the scanning direction D2. Here, the pixels are able to be independently allocated a color, and are the minimum element that configures the image. The dots are the minimum unit of an image formed by ink droplets on the printing material.

When the ink jet printer complements a dot due to the defective nozzle LN, K ink droplets 67k that form K dots Dk1 for complement are discharged from the K nozzles 64K to the neighboring pixels PX1 and PX2 along with discharging color ink droplets 67co that form composite black dots Dco for complement from color nozzles to the dot omission pixel PXL.

FIG. 18 schematically shows a comparative example that complements the K dots due to the defective nozzle LN with the formation of composite black dots only on the dot omission pixel PXL. The composite black dots Dco in the example are formed by superimposing the C dots, M dots and Y dots on the printing material. However, as shown in FIG. 18, it is difficult for the CMY dots to be completely superimposed, and colored stripes may be visible along the dot omission pixels that are contiguous in the scanning direction D2.

Because the brightness of the composite black dots Dco in which CMY is mixed is higher than the single color K dots, there may be light stripes along the dot omission pixels PXL contiguous in the scanning direction D2.

Meanwhile, in the technology, as shown as an example in FIG. 1, the K dots to be formed on the dot omission pixel PXL are complemented by the composite black dots Dco formed on the dot omission pixel PXL and the K dots formed on the neighboring pixels PX1 and PX2. Since the K ink droplets 67k are used for complement, coloring of the stripes along the K dot omission pixels PXL that are contiguous in the scanning direction D2 is suppressed, and light stripes along the dot omission pixels PXL are also suppressed. In a case of complementing with only the K dot formation on the neighboring pixels PX1 and PX2, it may be difficult to sufficiently cover dot omission pixel PXL with the complementary dots due to errors and the like arising in the transport of the printing material 400. In such a case, stripes in the printed image 330 are suppressed from being noticeable by the composite black dot Dco being formed on the dot omission pixel PXL.

Accordingly, the aspect is able to provide a technology able to further suppress stripes arising in a printed image 330 due to a defective nozzle LN in which the formation of a K dots is defective from being noticeable.

Incidentally, the printed image 330 is preferably formed by the printing material 400 being transported in the transport direction D3 that intersects the scanning direction D2, the nozzle row group (head 61) being moved in the scanning direction D2, and ink droplets 67 being discharged from the nozzle row group (head 61). In this case, as shown as an example in FIG. 11, the proportion of ink droplets 67co discharged from the color nozzles with respect to the dots due to the defective nozzles LN is preferably the proportion (Rc) according to the amount δ of the error arising in the transport of the printing material 400. This form is able to further suppress stripes in the printed image 330 from being noticeable according to the amount δ of the error arising in the transport of the printing material 400.

Figure 11:
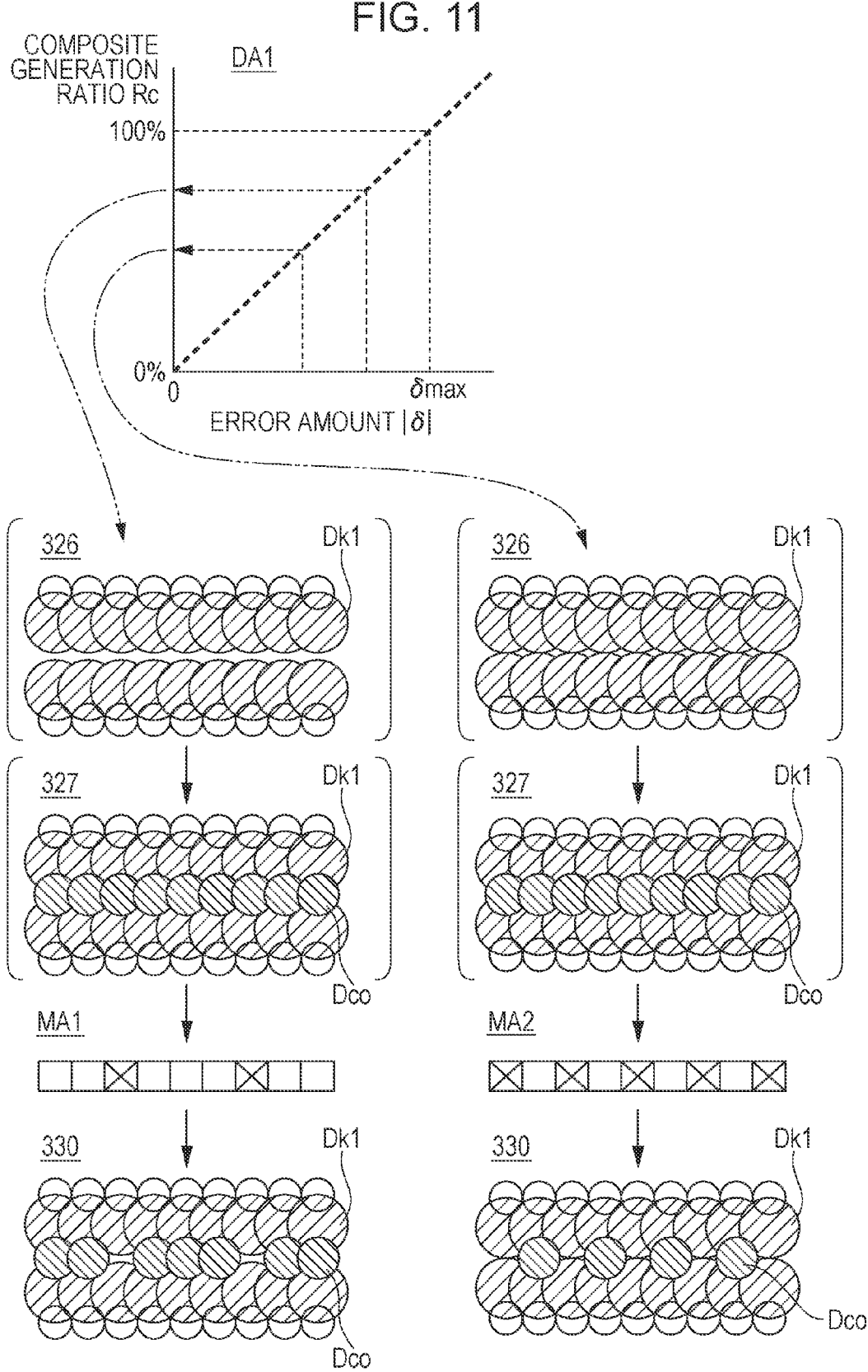
FIG. 11 is a drawing schematically showing an example in the composite black dot generation rate changed according to the error amount δ.

In the above case, as shown as an example in FIG. 11, the larger the amount δ of the error arising in the transport of the printing material 400, the more the proportion (Rc) of the ink droplets 67co discharged from the color nozzles with respect to the dots due to the defective nozzle LN preferably increases. In a case where the amount δ of the error in the transport of the printing material 400 is small, there are preferably few composite black dots Dco since the above-described stripes are not easily noticed, and in a case where the amount δ of the error arising in the transport of the printing material 400 is large, there are preferably many composite black dots Dco since the above-described stripes are easily noticed. Accordingly, the aspect is able to further suppress stripes in the printed image 330 from being noticeable.

The composite black dots Dco for complement are preferably formed according to conditions. For example, as shown as an example in FIG. 14, in a case where an error in which the K dots Dk formed on the neighboring pixels PX1 and PX2 are shifted to the receding side arises in the transport of the printing material 400, the composite black dots Dco for complement are preferably formed on the dot omission pixel PXL in addition to forming the K dots Dk1 for complement on the neighboring pixels PX1 and PX2. In a case where an error in which the K dots Dk formed on the dot omission pixel PXL, and the neighboring pixels PX1 and PX2 are shifted to the approaching side arises in the transport of the printing material 400, the composite black dots Dco for complement may not be formed on the dot omission pixel PXL, whereas the K dots Dk1 for complement are formed on the neighboring pixels PX1 and PX2. The aspect is able to further efficiently suppress stripes in the printed image 330 from being noticeable.

The neighboring pixels PX1 and PX2 preferably include a first neighboring pixel PX1 and a second neighboring pixel PX2 at positions on opposite sides of the dot omission pixel PXL to one another. In this case, as shown as an example in FIG. 15, the position in the scanning direction D2 of the K dots Dk formed by ink droplets 67k from the black nozzles 64K with respect to the first neighboring pixel PX1 and the position in the scanning direction D2 of the K dots Kd formed by ink droplets 67k from the black nozzles 64K with respect to the second neighboring pixel PX2 are preferably shifted. The aspect is able to further suppress stripes in the printed image 330 from being noticeable.

The printed image 330 is preferably formed by the interlace printing method in which transport of the printing material 400 in the transport direction D3 that intersects the scanning direction D2 and movement of the nozzle row group (head 61) in the scanning direction D2 are repeated, and ink droplets 67 are discharged from the nozzle row group (head 61). In a case in which the printing method is interlace printing, because the dots of adjacent pixels in the transport direction D3 are formed with different passes, the dot omission region AL in which dots are not formed may spread in the transport direction D3 when there is an error in the transport of the printing material 400. Accordingly, the aspect in which the printing method is interlace printing is suitable to further suppressing the stripes in the printed image 330 from being noticeable.

(2) FIRST SPECIFIC EXAMPLE OF INK JET PRINTER AND RECORDING METHOD

Figure 2:
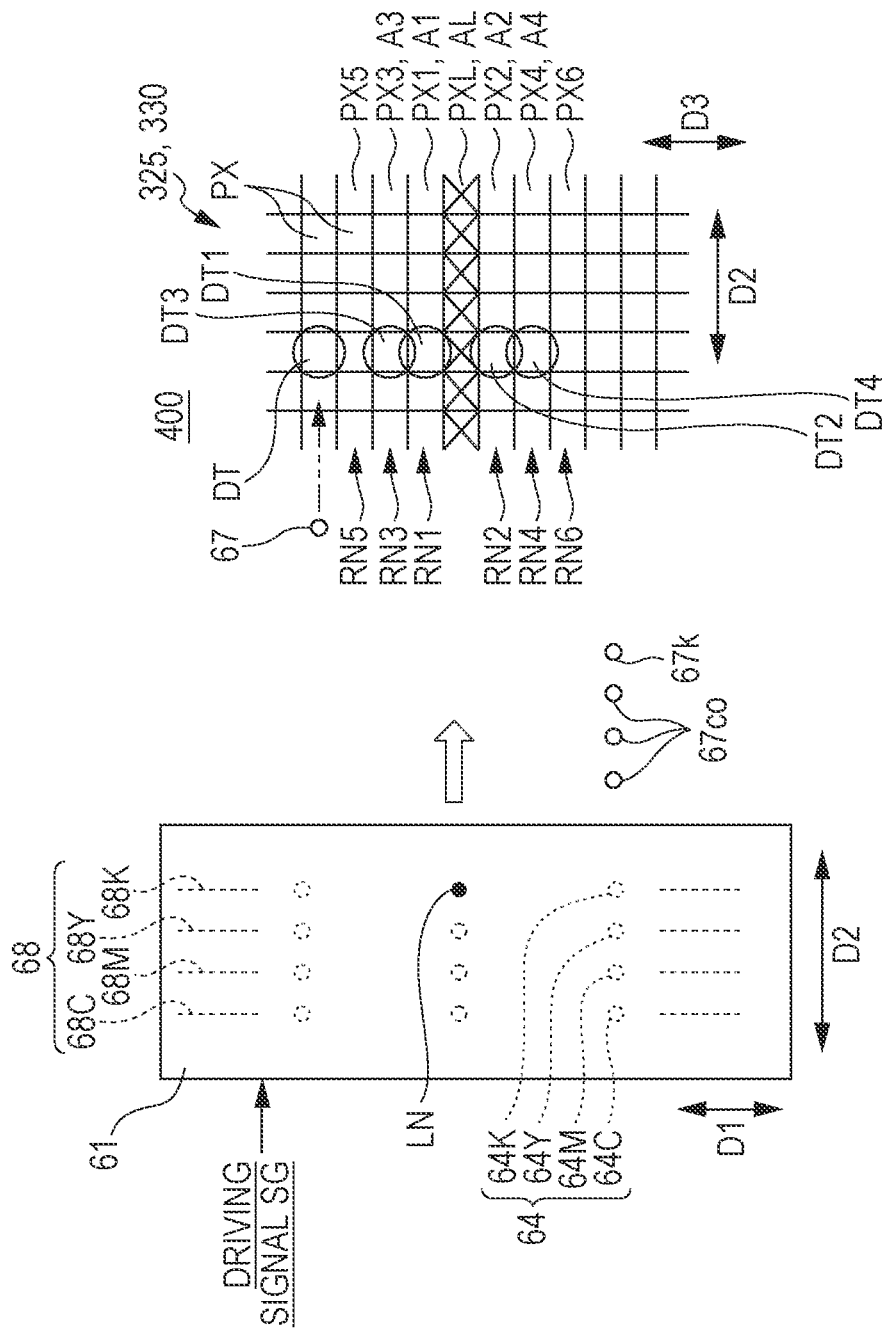
FIG. 2 is a drawing schematically showing an example of a correspondence relationship between the nozzles and the pixels.
Figure 3:
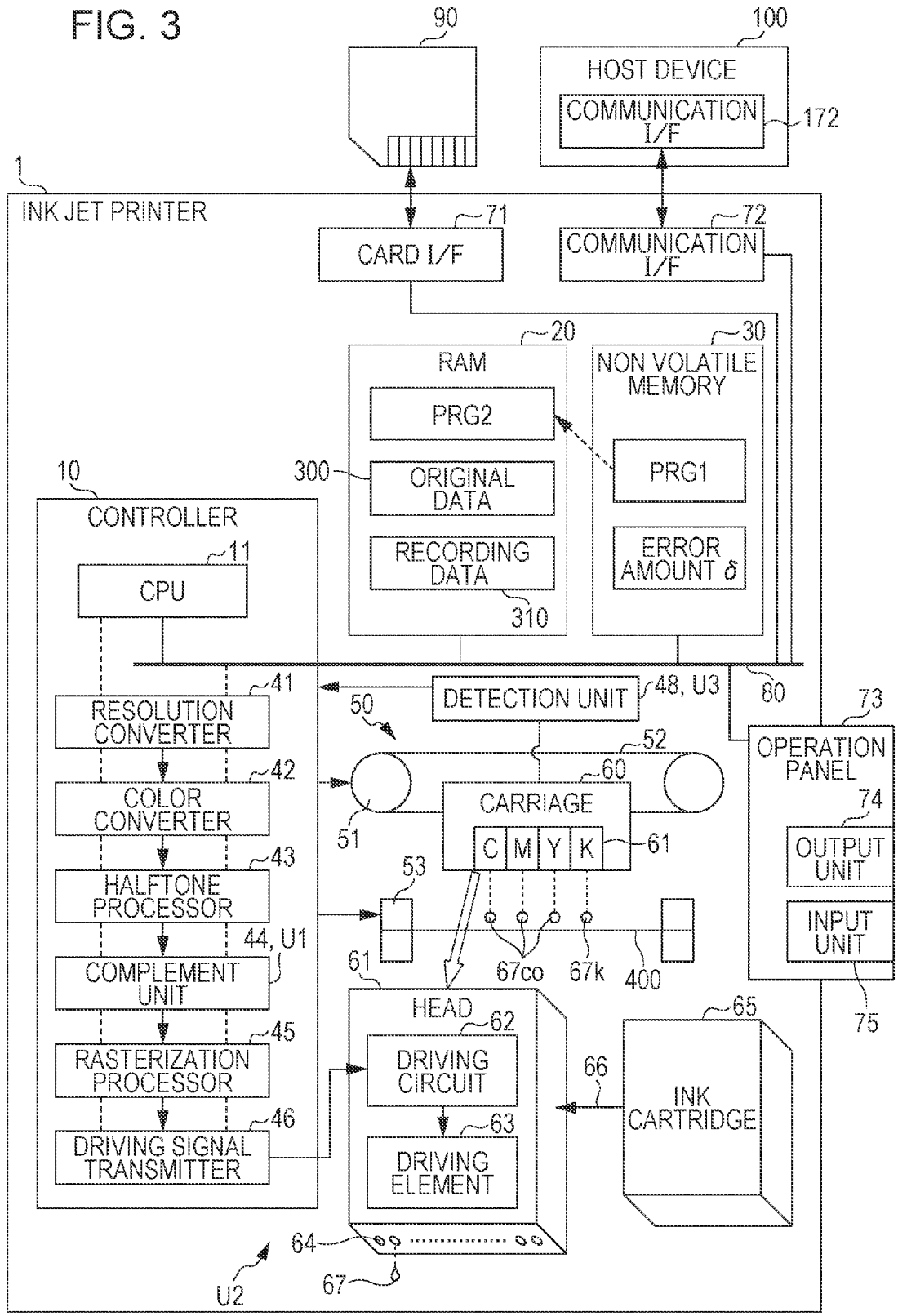
FIG. 3 is a drawing schematically showing an example of a configuration of an ink jet printer.
Figure 4:
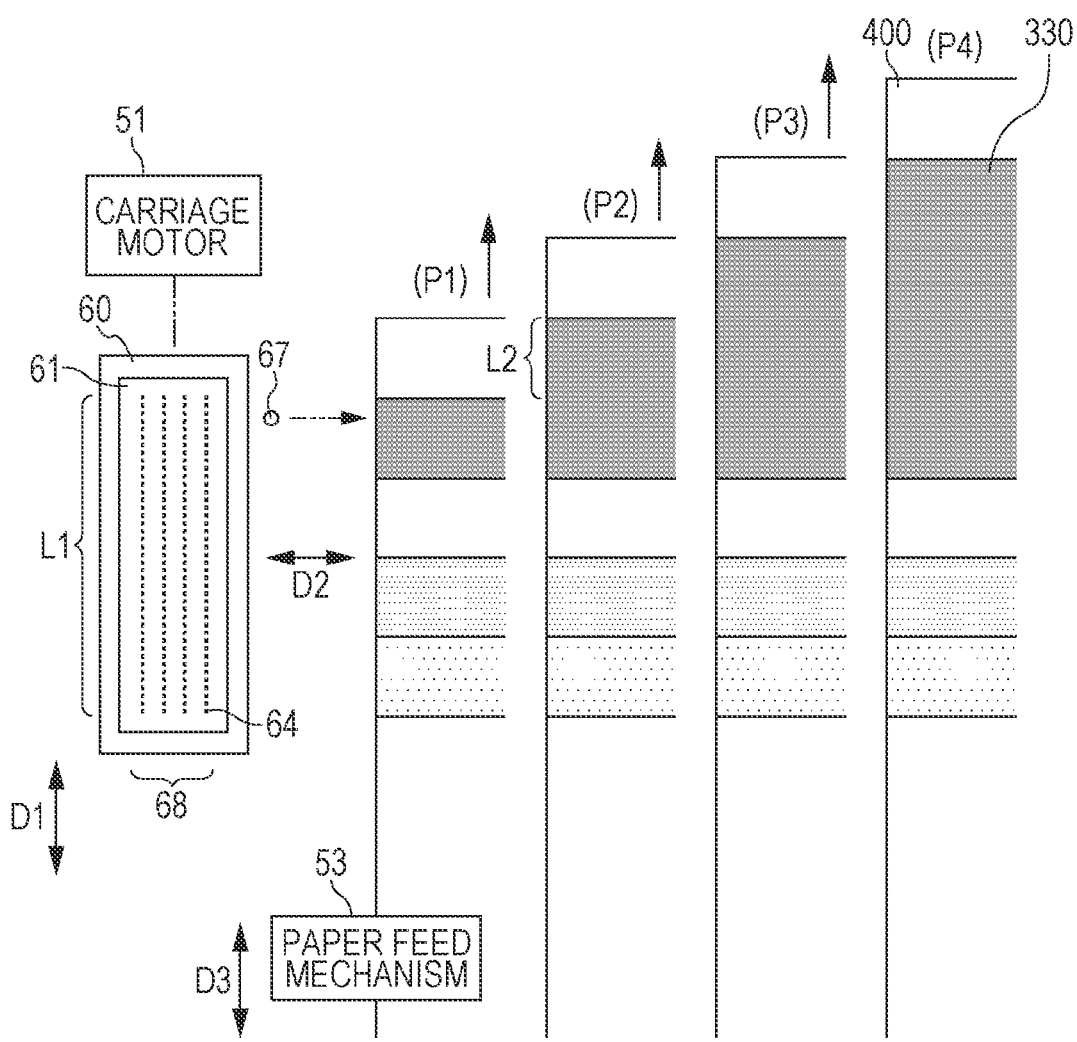
FIG. 4 is a drawing schematically showing an operation example of interlace printing.

FIG. 1 schematically shows an example of forming the composite black complementary dot Dco on the dot omission pixel PXL and K complementary dot Dk1 on the neighboring pixels PX1 and PX2. FIG. 2 schematically shows an example of the correspondence relationship between the nozzles 64 and the pixels PX. FIG. 3 schematically shows an example of a configuration of an ink jet printer 1. FIG. 4 schematically shows an operation example of interlace printing as the printing method. In the description, reference D1 indicates the arrangement direction of the nozzles 64, reference D2 indicates the scanning direction of the head 61, and the reference D3 indicates the transport direction of the printing material 400. The scanning direction D2 is referred to as the main scanning direction, and the transport direction D3 is referred to as the sub-scanning direction. Although the arrangement direction D1 and the transport direction D3 match in the examples in FIG. 4 and the like, the arrangement direction D1 and the transport direction D3 are preferably shifted. The directions D1 and D3 and the scanning direction D2 are preferably cross each other, and not only cases in which the directions are orthogonal to one another but also cases which the direction are not orthogonal are also included in the invention. Being shifted from strictly orthogonal due to error is also included in being orthogonal. In order to be shown and easily understood, the enlargement ratio of each direction may be different, and each drawing may not match. The dots shown in FIG. 1 and the like are schematically shown for thorough description, and the actual size, shape and the like of thereof are not limited to those in the drawings. The head 61 shown in FIGS. 1 to 6 is schematically shown for thorough description, and the actual size, shape and the like thereof is not limited to those in the drawings. Although the pitch of the pixels in FIG. 1 and the like is substantially the same in the transport direction D3 and the scanning direction D2, the pitch of the pixels preferably differs in the transport direction D3 and the scanning direction D2.

The ink jet printer 1 generates recording data 310 that indicates the printed image 330 in which the dots (shown by the broken line in FIG. 1) to be formed by the defective nozzle LN are complemented based on source data 300 that indicates a virtual image 325 before dot complementing not actually formed. The images 325 and 330 before and after complementing are multivalue or binary images that indicate the formation situation (including presence or absence) of the dots DT for each of the pixels PX that form an orderly line in each of the scanning direction D2 and the transport direction D3. The printed image 330 is the image actually formed with respect to the printing material 400.

Firstly, an example of the correspondence relationship between the nozzles 64 and the pixels PX will be described. The recording head 61 shown in FIG. 2 is a nozzle row group in which the C (cyan) row 68C, the M (magenta) nozzle row 68M, the Y (yellow) nozzle row 68Y, and the K (black) nozzle row 68K are lined up in the scanning direction D2. A head 61 is preferably separately provided for each color of CMYK. The order of colors of the nozzle rows in the scanning direction D2 is not limited to the example in FIG. 2. Each of the nozzle rows 68C, 68M, 68Y, and 68K have a plurality of nozzles 64C, 64M, 64Y, and 64K that discharge (eject) ink droplets 67 lined up in a predetermined arrangement direction D1. Here, the nozzle rows 68C, 68M, 68Y, and 68K are collectively referred to as nozzle row 68, and the nozzles 64C, 64M, 64Y, and 64K are collectively referred to as nozzles 64. The K nozzles 64K discharge K ink droplets 67k. The C nozzles 64C, the M nozzles 64M, and the Y nozzles 64Y discharge CMY ink droplets 67co that generate composite black. In the specific example, generating composite black by mixing CMY droplets with the same volume at a ratio of 1:1:1, that is, forming composite black dots by forming CMY dots with the same size at a ratio of 1:1:1 is described. Naturally, the mixing ratio of the CMY ink droplets is not limited to 1:1:1.

Even if the nozzle rows have the nozzles arranged in a zig-zag pattern, the plurality of nozzles is lined up in, for example, two rows in a predetermined arrangement direction different to the scanning direction, and is included in the technology. The arrangement direction in this case indicates the arrangement direction of the nozzles in each row in the zig-zag arrangement.

The head 61 shown in FIG. 2 is schematically shown from the opposite side of the nozzle surface having the nozzles 64 in order to match the printed image 330. In the nozzle row 68, defective nozzles LN in which ink droplets are not discharged due to clogging or the like, or the discharged ink droplets do not trace the correct path may occur. When there is a defective nozzle LN, a "missing dot" region (dot omission region AL) in which dot omission pixels PXL on which dots DT are not formed are connected in the scanning direction D2 is formed on the printing material 400. That is, the plurality of pixels PX that configure the formed image 330 includes the dot omission pixels PXL contiguous in the scanning direction D2 due to the defective nozzle LN included in the plurality of nozzles 64. Stripes of the base color of the printing material 400 arise in the printed image 330 along the scanning direction D2 due to the dot omission region AL. If the printing material 400 is white, white stripes arise. In particular, when there is a defective nozzle LN in the K nozzle row 68K, a stripe of the base color of the printing material 400 becomes noticeable.

In the technology, the vicinity forming nozzles neighboring the defective nozzle LN on both side in the arrangement direction D1 are referred to as the primary vicinity forming nozzles RN1 and RN2, the vicinity forming nozzles that neighbor the primary vicinity forming nozzles RN1 and RN2 on the opposite side to the defective nozzle LN from the primary vicinity forming nozzles RN1 and RN2 are referred to as the secondary vicinity forming nozzles RN3 and RN4, respectively, the vicinity forming nozzles that neighbor the secondary vicinity forming nozzles RN3 and RN4 on the opposite side to the defective nozzle LN from the secondary vicinity forming nozzles RN3 and RN4 are referred to as tertiary vicinity forming nozzles RN5 and RN6, respectively, the vicinity pixels the neighbor the dot omission pixel PXL on both sides in the transport direction D3 are referred to as the neighboring pixels PX1 and PX2, respectively, the vicinity pixels that neighbor the neighboring pixels PX1 and PX2 on the opposite side to the dot omission pixel PXL from the neighboring pixels PX1 and PX2 are referred to as secondary neighboring pixels PX3 and PX4, respectively, and the vicinity pixels that neighbor the secondary neighboring pixels PX3 and PX4 on the opposite side to the dot omission pixel PXL from the secondary neighboring pixels PX3 and PX4 are referred to as tertiary neighboring pixels PX5 and PX6, respectively. The region of the pixels PXL contiguous in the scanning direction D2 is referred to as the dot omission region AL, the regions of the neighboring pixels PX1 and PX2 contiguous in the scanning direction D2 are referred to as neighboring regions A1 and A2, respectively, and the regions of secondary neighboring pixels PX3 and PX4 contiguous in the scanning direction D2 are referred to as the secondary neighboring regions A3 and A4, respectively. Dots DT1, DT2, DT3, and DT4 are formed on the pixels PX1, PX2, PX3, and PX4, respectively, by ink droplets 67 discharged from the nozzles RN1, RN2, RN3, and RN4. As shown as an example in FIG. 1, the technology complements the dots due to the K defective nozzle LN with the complement, composite black dots Dco on the dot omission pixel PXL and K dots Dk1 on the neighboring pixels PX1 and PX2.

The ink jet printer 1 shown in FIG. 3 includes a controller 10, a Random Access Memory (RAM) 20, a nonvolatile memory 30, a defective nozzle detection unit 48, a mechanism unit 50, interfaces (I/F) 71 and 72, an operation panel 73, and the like. The controller 10, RAM 20, nonvolatile memory 30, I/Fs 71 and 72, and operation panel 73 are connected to a bus 80 and able to input and output information to one another.

The controller 10 includes a Central Processing Unit (CPU) 11, a resolution converter 41, a color converter 42, a halftone processor 43, a complement unit 44 (U1), a rasterization processor 45, a driving signal transmitter 46 and the like. The controller 10, along with the mechanism unit 50, configures a dot forming unit U2, and, along with the defective nozzle detection unit 48, configures the defective nozzle detector U3. It is possible for the controller 10 to be configured by a System on a Chip (SoC) or the like.

The CPU 11 is a device that centrally performs information processing and control in the ink jet printer 1.

The resolution converter 41 converts the resolution of the input image from a host device 100, a memory card 90 or the like to a set resolution (for example, the transport direction 3 to 600 dpi and the scanning direction D2 to 1200 dpi). The input image is expressed by RGB data having integer values of 256 RGB (red, green, blue) gradations.

The color converter 42 converts RGB data with the set resolution to CMYK data having integer values of 256 CMYK gradations in each pixel.

The halftone processor 43 reduces the number of gradations of the gradient value by performing a predetermined halftone processing, such as a dither method, an error diffusion method, and a density pattern method, with respect to the gradient value of each pixel that configures the CMYK data, and generates source data 300 before complementing the dots due to the defective nozzle LN. The source data 300 is data indicating the formation state of the dots, and may be binary data indicating the present or absence of dot formation, or may be multivalue data of three gradations or more able to correspond to different sizes of dots, such as each of small, medium, and large dots. It is possible for the binary data which is able to express each pixel with one bit to be data in which dot formation corresponds to 1 and no dot to 0. It is possible for the four value data which is able to express each pixel with two bits, to be data in which large dot formation corresponds to 3, medium dot formation to 2, small dot formation to 1 and no dot to 0. In a case of making the large dots the dedicated complementary dot, the source data 300 is preferably multivalue data in which large dots are not formed.

The complement unit 44 generates recording data 310 in which dots are complemented on the neighboring pixels PX1 and PX2 and composite black dots are complemented on the dot omission pixel PXL based on the source data 300. Accordingly, the recording data 310 is also data that indicates the formation situation of the dots, and is preferably binary data or is preferably multivalue data with three gradations or more.

The rasterization processor 45 generates raster data (image data of a pass unit) by arranging the recording data 310 in the order in which dots are formed with the mechanism unit 50.

The driving signal transmitter 46 generates a driving signal SG corresponding to a voltage signal applied to the driving element 63 of the head 61 from raster data and outputs the signal to the driving circuit 62. For example, if the recording data 310 is "large dot formation", a driving signal in which an ink droplet for a large dot is discharged is output, if the recording data 310 is "medium dot formation", a driving signal in which an ink droplet for a medium dot is discharged is output, and if the recording data 310 is "small dot formation", a driving signal in which an ink droplet for a small dot is discharged is output. Each of these portions 41 to 46 is preferably configured by an Application Specific Circuit (ASIC), or preferably directly reads processing target data from the RAM 20 and directly writes the post-processing data to the RAM 20.

The mechanism unit 50 controlled by the controller 10 is includes a carriage motor 51, a paper feed mechanism 53, a carriage 60, a head 61, and the like, and, along with the controller 10, configures the dot forming unit U2. The carriage motor 51 reciprocates the carriage 60 in the scanning direction D2 via a plurality of gears and a belt 52, not shown. The paper feed mechanism 53 transports the printing material 400 in the transport direction D3. The head 61 that discharges, for example, the CMYK ink droplets 67 is mounted on the carriage 60. The head 61 includes a driving circuit 62, a driving element 63, and the like. The driving circuit 62 applies a voltage signal to the driving element 63 in accordance with the driving signal SG input from the controller 10. In the driving circuit 62, it is possible for a piezoelectric element applies pressure to ink 66 in a pressure chamber that communicates with a nozzle 64, a driving element in which ink droplets 67 are discharged from the nozzle 64 by generating bubbles in a pressure chamber through heating, or the like to be used as the driving element 63. Ink 66 is supplied from the ink cartridge 65 to the pressure chamber of the head 61. A combination of ink cartridge 65 and head 61 is provided for each of CMYK. The ink 66 in the pressure chamber is discharged as ink droplets 67 from the nozzle 64 by the driving element 63 towards the printing material 400, and dots DT of the ink droplets 67 are formed on the printing material 400, such as a printing sheet. By moving the head 61 in the scanning direction D2, that is, by relatively moving the plurality of nozzles 64 and the printing material 400 in the scanning direction, the printed image 330 corresponding to the recording data 310 is formed by a plurality of dots DT. If the multivalue data is four-value data, the image 330 is printed by formation of the dots corresponding to the dot size represented by the multivalue data.

FIG. 4 schematically shows interlace printing that intermittently transports the printing material 400 with the paper feed mechanism 53, thereby forming the printed image 330 with ink droplets 67 from the head 61. FIG. 5 is schematically shows an example of forming a printed image 330 when no error in the transport amount of the printing material 400 occurs. Interlace printing is a printing method that forms dots DT by repeating transport of the printing material 400 in the transport direction D3 and movement of the head 61 in the scanning direction D2, and discharging ink droplets 67 from the head 61. Interlace printing lands the ink droplets 67 discharged from adjacent nozzles 64 in the arrangement direction D1 on non-adjacent pixels PX in the transport direction D3, and lands ink droplets 67 with respect to pixels PX between positions on which ink droplets 67 are temporally not landed at a later scan.

As shown in FIG. 4, when the length of the nozzle row 68 in the arrangement direction D1 is L1 and the transport distance of one pass of the printing material 400 intermittently transported in the transport direction D3 is L2, L2<L1 in the interlace printing. In the example in FIG. 4, when the head 61 is moved in the scanning direction D2 on pass 1 and the dots are formed by the ink droplets 67 when the transport of the printing material 400 is stopped, the printing material 400 is transported by the distance L2, and the head 61 is moved in the scanning direction D2 and dots are formed by the ink droplets 67 on the next pass P2 when the transport of the printing material 400 is stopped. In bidirectional (Bi-d) printing, the movement directions of the head 61 when discharging ink droplets is different in passes P1 and P2, and, in unidirectional (Uni-d) printing, the movement direction of the head 61 when discharging ink droplets is the same is the same in passes P1 and P2. For the subsequent passes P3, P4 and the like, the operation is similarly performed. In FIGS. 4 and 5, although an example of L1=4×L2 is shown, L1≤3×L2, L1≥5× L2, and the like are preferably used.

In FIG. 5, for the sake of convenience, seven nozzles 64, which is fewer than in practice, are lined up in the arrangement direction D1 as the nozzle row 68, each nozzle 64 is indicated by a circled number, and the relative positions of the head 61 with respect to the printing material 400 are shown in pass order. Directly to the right side of the head 61, the dots DT arranged in each pixel PX formed by ink droplets are discharged from which of nozzles circle 1 to circle 7 is indicated by the circled numbers. The nozzle pitch Np that is the arrangement gap between the centers of the nozzles 64 lined up in the arrangement direction D1 is larger than the pixel pitch Yp that is the arrangement gap between the centers of the pixels PX in the transport direction D3. In FIG. 5, although Np=4×Yp is shown as an example, Np≤3×Yp, Np≥5×Yp and the like are preferably used. The transport amount Cp of the printing material 400 between passes is larger than the nozzle pitch Np. In FIG. 5, although Cp=7×Yp is shown as an example, Cp is preferably set according to the nozzle pitch Np or the number of nozzles of the nozzle row, or Cp≤6×Yp, Cp≥8×Yp and the like are preferably used. In a case where Np=4×Yp, and Cp=7×Yp, for the seven pixel region 400a in the transport direction D3 from the pixel on which dot circle 1 is formed to the pixel on which dot circle 6 is formed on the printing material, dot circle 7 is formed on the first pass, dots circle 5 and circle 6 are formed on the next pass, dots circle 3 and circle 4 are formed on the next pass, and dots circle 1 and circle 2 are formed on the final pass.

The description continues by returning to FIG. 3.

The RAM 20 is a large capacity volatile semiconductor memory, in which a program PRG2, source data 300, recording data 310, and the like are stored. The program PRG2 includes an image forming program that causes an ink jet printer 1 to realize a complementing function corresponding to each unit U1 to U3 of the ink jet printer 1, a dot formation function, and a defective nozzle detection function.

A program data PRG1, information corresponding to the amount δ of the error arising in one transport of the printing material 400 that is intermittently transported during interlace printing, and the like are stored in the nonvolatile memory 30. For example, workers at the ink jet printer manufacturing factory perform the task of measuring the error amount δ, and recording the amount in the nonvolatile memory 30. Naturally, a user of the ink jet printer preferably performs the task of measuring the error amount δ and recording the amount in the nonvolatile memory 30. A Read Only Memory (ROM), a magnetic recording medium, such as a hard disk, and the like are used as the nonvolatile memory 30. The wording "expand the program data PRG1" indicates being written to the RAM 20 as a program that is interpretable by the CPU 11.

The card I/F 71 is a circuit that writes data to the memory card 90 and reads data from the memory card 90. The memory card 90 is a nonvolatile memory capable of writing and erasing data, and on which images and the like captured by an image capturing device, such as a digital camera, are stored. The image is represented, for example, by pixel values with an RGB color space and each RGB pixel value is represented by an eight bit gradient value of 0 to 255.

The communication I/F 72 is connected to the communication I/F 172 of the host device 100, and inputs information with respect to the host device 100. It is possible for a Universal Serial Bus (USB) or the like to be used as the communication I/F 72 and 172. The host device 100 includes computers, such as personal computers, digital cameras, digital video cameras, and portable telephones, such as smartphones.

The operation panel 73 includes an output unit 74, an input unit 75, and the like, and a user is able to input various instructions with respect to the ink jet printer 1. The output unit 74, for example, is configured by a liquid crystal panel (display unit) that displays information according to the various instructions and information that indicates the state of the ink jet printer 1. The output unit 74 is preferably performs audio output of the information. The input unit 75, for example, is configured by operation keys (operation input unit), such as cursor keys or setting keys. The input unit 75 is preferably a touch panel or the like that receives operations to the display screen.

The defective nozzle detection unit 48, along with the controller 10, configures the defective nozzle detector U3 that detects whether the state of each nozzle 64 is normal or defective.

Figure 6A:
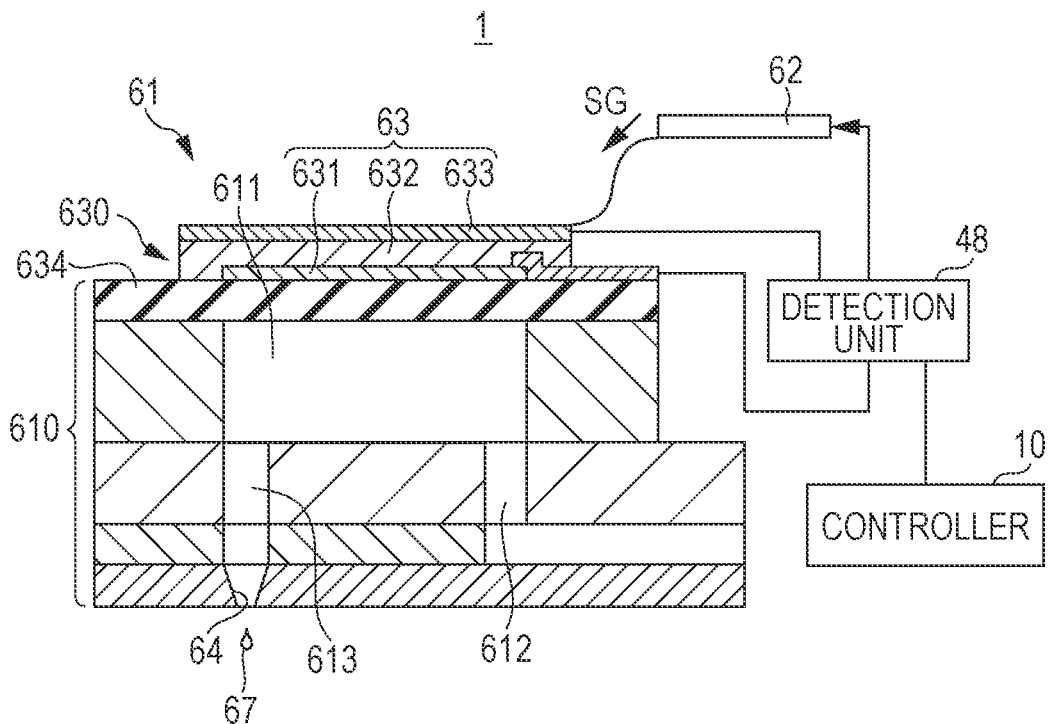
FIG. 6A is a drawing schematically showing the essential portions of the ink jet printer.
Figure 6B:
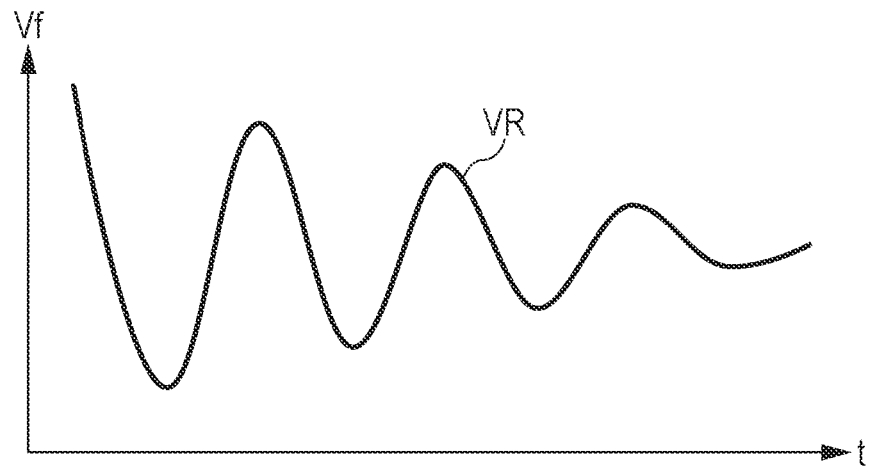
FIG. 6B is a drawing schematically showing an example of an electromotive force curve based on the residual vibration of a diaphragm.
Figure 7A:
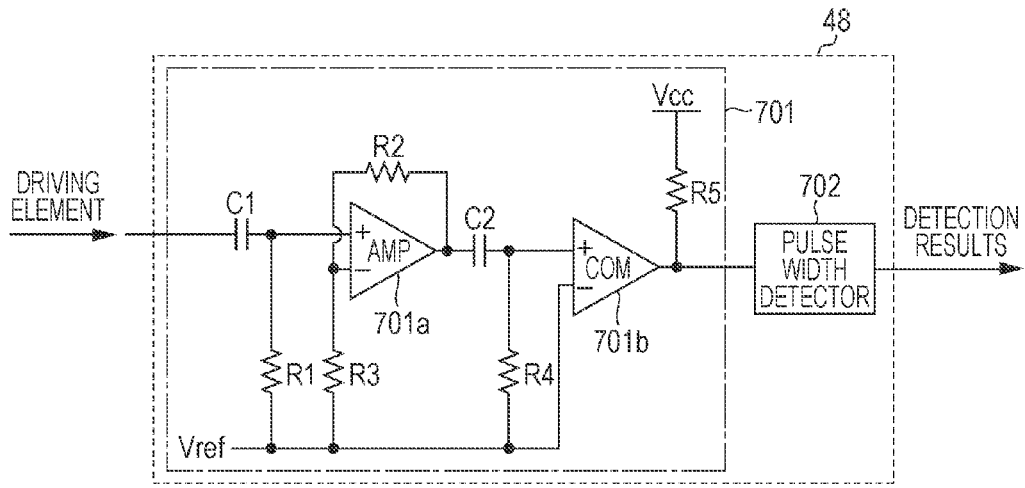
FIG. 7A is a drawing showing an example of an electrical circuit of a defective nozzle detection unit.
Figure 7B:
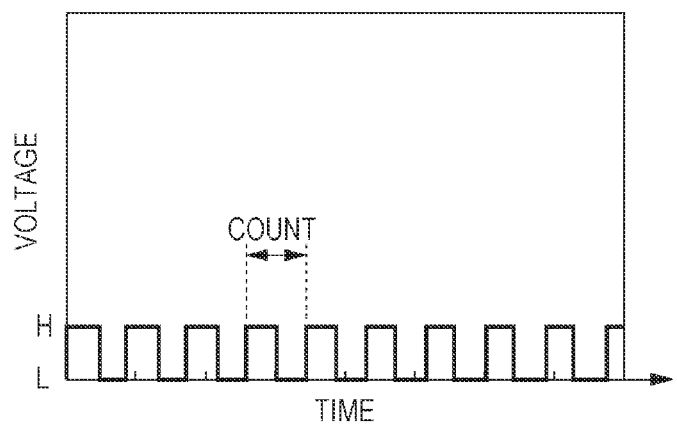
FIG. 7B is a drawing schematically showing an example of an output signal from an amplifier 701.

FIGS. 6A and 6B are drawings for describing an example of a method for detecting the state of the nozzle 64. FIG. 6A schematically shows the essential portions of the ink jet printer 1 and FIG. 6B schematically shows an example of an electromotive force curve VR based on the residual vibration of a diaphragm 630. FIG. 7A is shows an example of an electrical circuit of a detection unit 48. FIG. 7B schematically shows an example of an output signal from comparator 701b.

A pressure chamber 611, an ink supply path 612 in which ink 66 flows to the pressure chamber 611 from the ink cartridge 65, a nozzle communication path 613 in which 66 ink flows to the nozzle 64 from the pressure chamber 611, and the like are formed on the flow channel substrate 610 of the head 61 shown in FIG. 6A. It is possible for a silicon substrate or the like to be used as the flow channel substrate 610. The surface of the flow channel substrate 610 becomes the diaphragm unit 634 that configures a portion of the wall surface of the pressure chamber 611. It is possible for the diaphragm unit 634 to be configured by, for example, silicon oxide, or the like. It is possible for the diaphragm 630 to be configured by a diaphragm unit 634, a driving element 63 formed on the diaphragm unit 634, and the like. It is possible for the driving element 63 to be a piezoelectric element or the like having a lower electrode 631 formed on the diaphragm unit 634, a piezoelectric layer 632 substantially formed on the lower electrode 631, and an upper electrode 633 substantially formed on the piezoelectric layer 632. It is possible for the electrodes 631 and 633 to use, for example, platinum, a metal, or the like. It is possible for the piezoelectric layer 632 to use a ferroelectric perovskite oxide or the like, such as PZT (lead zirconate titanate, in stoichiometric proportion of $Pb(Zr_x, Ti_{1-x})O_3$).

FIG. 6A shows the essential portions of the ink jet printer 1 provided with a detection unit 48 that detects the electromotive force state from the piezoelectric element (driving element 63) based on the residual vibrations of the diaphragm 630 through a block diagram. One end of the detection unit 48 is electrically connected with respect to the lower electrode 631, and the other end of the detection unit 48 is electrically connected with respect to the upper electrode 633.

FIG. 6B shows an example of an electromotive force curve (electromotive force state) VR of the driving element 63 based on the residual vibration of the diaphragm 630 that arises after the supply of the driving signal SG for discharging the ink droplets 67 from the nozzle 64. Here, the horizontal axis is the time t, and the vertical axis is the electromotive force Vf. The electromotive force curve VR shows an example in which ink droplets 67 are discharged from a normal nozzle 64. When the ink droplet 67 is not discharged from the nozzle or the ink droplet 67 does not trace the correct path due to clogging or the like, the electromotive force curve VR is shifted. It is possible to detect whether a nozzle 64 is normal or defective using a detection circuit as shown in FIG. 7A.

The detection unit 48 shown in FIG. 7A includes an amplifier 701 and a pulse width detector 702. The amplifier 701 includes, for example, an operational amplifier 701a, a comparator 701b, condensers C1 and C2, and resistors R1 to R5. When the driving signal SG output from the driving circuit 62 is applied to the driving element 63, residual vibration arises, and an electromotive force based on the residual vibration is input to the amplifier 701. The low frequency components included in the electromotive force is removed by a high pass filter configured by the condenser C1 and the resistor R1, and the electromotive force after removal of the low frequency components is amplified by a predetermined amplification factor by the operational amplifier 701a. The output of the operational amplifier 701a passes through the high pass filter configured by the condenser C2 and the resistance R4, is compared to the standard voltage Vref by the comparator 701b, and is converted to either a high level H or a low level L pulse-like voltage according to whether or not the output is higher than the standard voltage Vref.

FIG. 7B shows an example of the pulse-like voltage output from the comparator 701b and input to the pulse width detector 702. The pulse width detector 702 resets the count value during rising of the input pulse-like voltage, increments the count value every predetermined interval, and outputs the count value during the next rising of the pulse-like voltage as a detection result to the controller 10. The count value corresponds to the period of the electromotive force based on the residual vibration, and indicates the sequentially output count values indicate the frequency response characteristics of the electromotive force based on the residual vibration. The frequency response characteristics (for example, period) of the electromotive force in a case in which a nozzle is a defective nozzle LN is different to the frequency response characteristics of the electromotive force in a case where the nozzle is normal. The controller 10 is able to determine whether or not the detection target nozzle is normal if the sequentially input count value is within the allowable range, and is able to determine that a detection target nozzle is a defective nozzle LN if the sequentially input count value is outside the allowable range.

By performing the above-described process for each nozzle 64, the controller 10 is able to ascertain the state of each nozzle 64, and able to store information indicated the position of the defective nozzle LN in, for example, the RAM 20 or the nonvolatile memory 30.

Naturally, detection of the defective nozzle LN is not limited to the method described above. For example, the ink droplets 67 being discharged while sequentially switching the target nozzle from the plurality of nozzles 64, and receiving the operation input of information (for example, a nozzle number) that identifies a nozzle that does not form a dot on the printing material 400 is also included in the detection of the defective nozzle LN. When the information that identifies the defective nozzle LN before being shipped from the manufacturing factory is stored in, for example, the nonvolatile memory 30, it becomes unnecessary to provide a defective nozzle detector U3 in the ink jet printer 1.

In a case in which there is a defective nozzle LN in the nozzle row 68, complementing the dot due to the defective nozzle LN by forming a complementary dot on the neighboring pixels PX1 and PX2 as shown in FIG. 5 is considered. In the example in FIG. 5, the K nozzle circle 5 is a defective nozzle LN, and a K dot Dk that includes the dot circle 5 on which a K dot (indicated by the broken line in FIG. 5) is not actually formed in the virtual image 325 represented by the source data 300 is arranged, and an image 326 is displayed in which the dot circle 5 is complemented by the K large dot Dk1 of neighboring pixels PX1 and PX2 (circle 3 and circle 7), and a small dot Dk2 is arranged on the secondary neighboring pixels PX3 and PX4 (circle 1 and circle 2). FIG. 5 shows an image 326 in a case in which the amount δ of the error arising in the transport of the printing material 400 is 0, and shows the dot omission region AL substantially covered by the K large dot Dk1. In this case, it is possible for the image 326 to be formed as is as the printed image 330 without complementing by the composite black dot.

However, the width (length in the transport direction D3) of the dot omission region AL changes according to the error amount δ of the transport. In a case of performing interlace printing, because the dots of adjacent pixels in the transport direction D3 are formed on different passes, the dot omission region may spread in the transport direction D3 when the error amount δ of the transport is not 0.

FIG. 1 shows the relative position of the head 61 in a case where the amount δ of the error arising in one transport of the intermittently transported printing material 400 is negative, and $Cp=7 \times Yp-|\delta|$, the formation position of the dot DX, a virtual image 325 represented by the source data 300, and a printed image 330 in which the composite black dots Dco of the dot omission pixel PXL and the large dots Dk1 of the neighboring pixels PX1 and PX2 are complemented. In a case where δ<0, an error of $+|\delta|$ arises between the dots circle 1 and circle 3 in the transport direction D3, between the dots circle 3 and circle 5, between the dots circle 5 and circle 7, between the dots circle 2 and circle 4 and between the dots circle 4 and circle 6. This indicates that the dots formed on the neighboring pixels PX1 and PX2 on both sides of the dot omission pixel PXL recede in many cases. For example, in a case in which the K nozzle circle 5 is the defective nozzle LN, because an error of $2 \times |\delta|$ arises between the dots circle 3 and circle 7, the composite black dots Dco in the printed image 330 in FIG. 1 spread in the transport direction D3 by the error amount of $+2 \times |\delta|$ compared to a case in which the dot omission region AL is δ=0 as in the location shown by the broken line. In this case, stripes of the base color of the printing material 400 arise if composite complementing is not performed.

Figure 8:
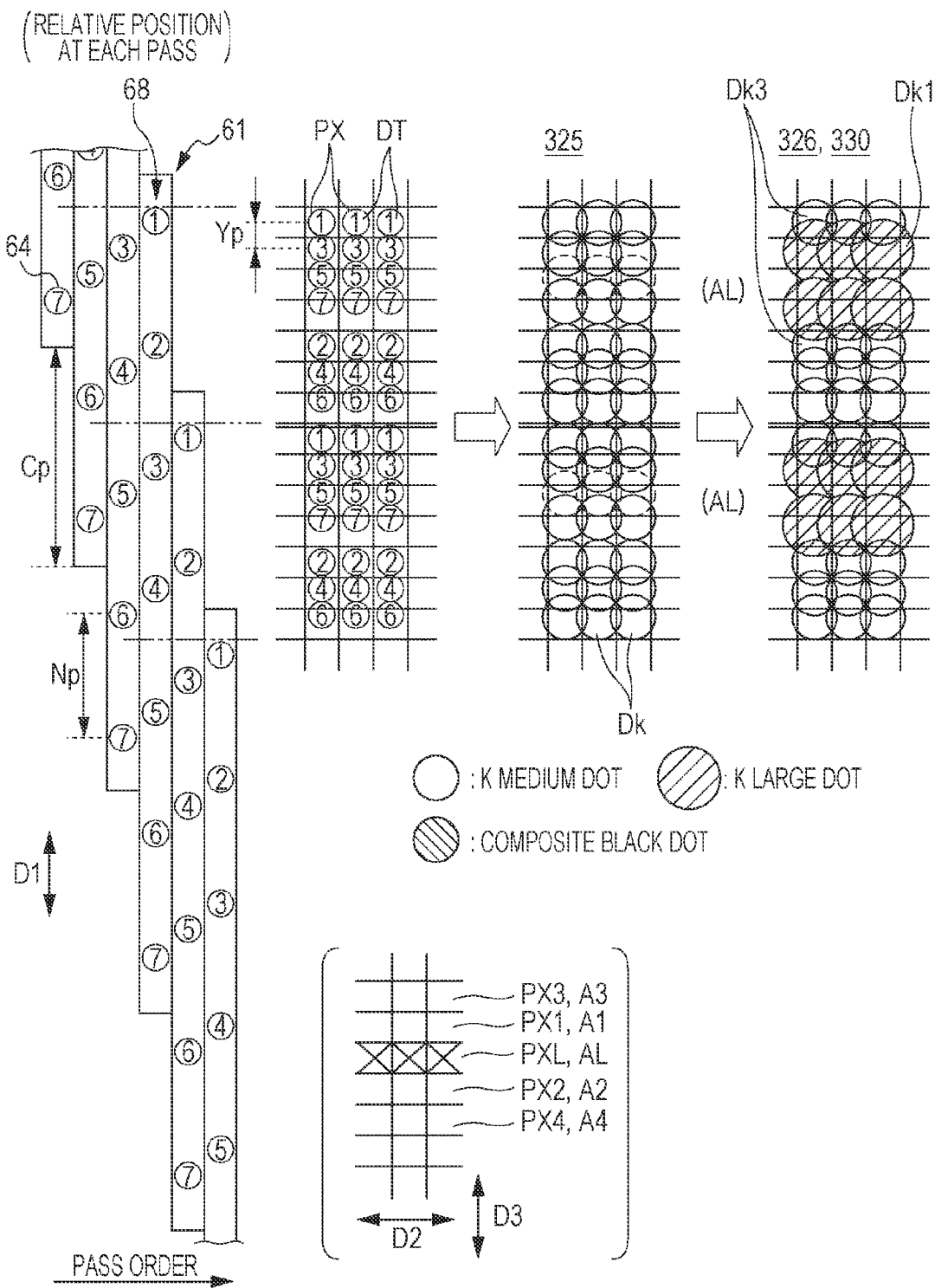
FIG. 8 is a drawing schematically showing an example of an image formed when the error amount δ in the transport of the printing material is positive.

FIG. 8 shows the relative position of the head 61 in a case where the amount δ of the error arising in one transport of the intermittently transported printing material 400 is positive, and $Cp=7 \times Yp+\delta$, the formation position of the dot DX, a virtual image 325 represented by the source data 300, and a printed image 330 in which the large dots Dk1 of the neighboring pixels PX1 and PX2 are complemented. In a case where δ>0, an error of −δ arises between the dots circle 1 and circle 3 in the transport direction D3, between the dots circle 3 and circle 5, between the dots circle 5 and circle 7, between the dots circle 2 and circle 4 and between the dots circle 4 and circle 6. For example, in a case in which the K nozzle circle 5 is the defective nozzle LN, because an error of −2×δ arises between the dots circle 3 and circle 7, narrowing occurs in the transport direction D3 by the error amount of −2×δ compared to a case in which the dot omission region AL is δ=0. In this case, stripes of the base color of the printing material 400 are suppressed even if composite complementing is not performed.

However, since an error of +3×δ arises between the dots circle 7 and circle 2, and an error of +2×δ arises between the dots circle 6 and circle 1, in a case in which any of the K nozzles circle 1, circle 2, circle 6 and circle 7 is the defective nozzle LN, the dot omission region AL spreads in the transport direction D3. Accordingly, even in a case of δ>0, the composite complementing is preferably used therewith.

In a case in which δ>0, when dots formed on the secondary neighboring pixels PX3 and PX4 are reduced from medium dots to small dots as shown in FIG. 5, a slight gap arises between the tertiary neighboring pixels on opposite sides to the neighboring pixels PX1 and PX2 from the secondary neighboring pixels PX3 and PX4 and the secondary neighboring pixels PX3 and PX4. In a case in which δ>0, the dots arranged on the tertiary neighboring pixels are preferably not reduced.

(3) DESCRIPTION OF PRINTING PROCESS IN FIRST SPECIFIC EXAMPLE

Figure 9:
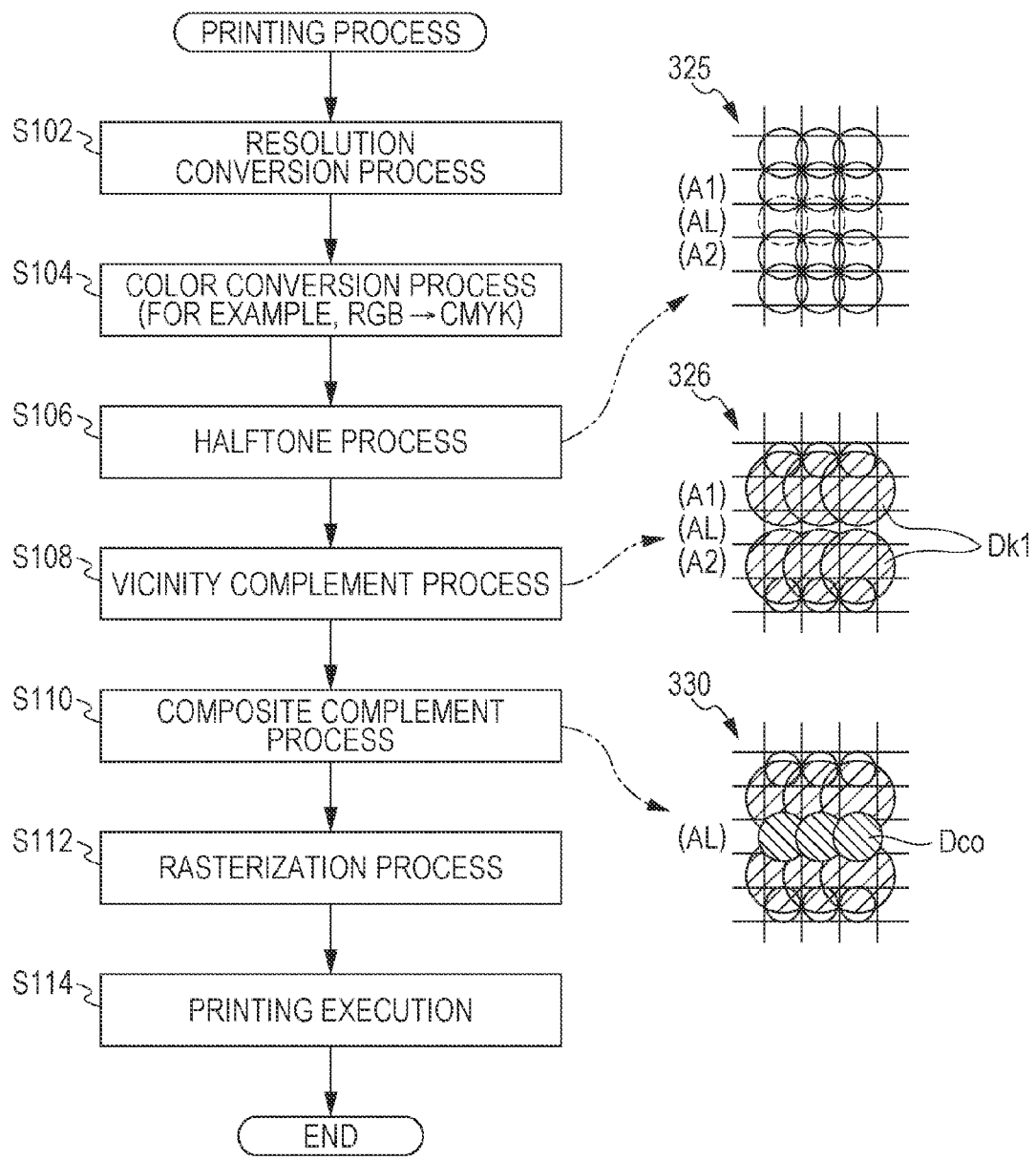
FIG. 9 is a flowchart showing an example of a printing process.
Figure 10:
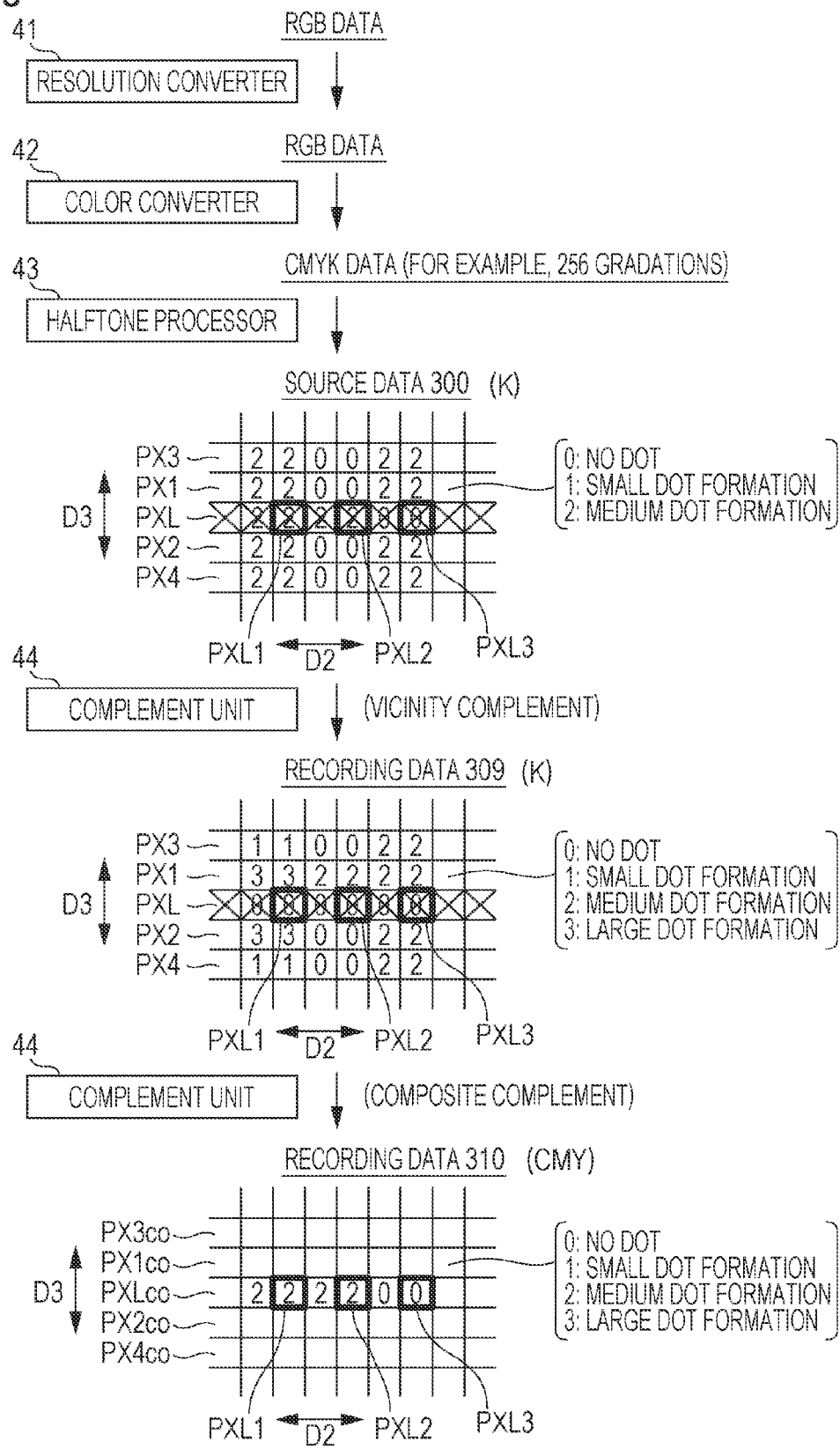
FIG. 10 is a drawing schematically showing the flow of the printing process.

FIG. 9 shows an example of the printing process performed by the ink jet printer 1 with a flowchart. The process of Steps S102 to S114 that formed the printed image 330 based on the input image from the host device 100, memory card 90 or the like is performed in sequence of each portion 41 to 46 and 50 as described above. Below the term "Step" will not be included. The printing process is preferably realized by an electric circuit, or is preferably realized by a program. FIG. 10 schematically shows the flow of the printing process.

When the printing process is started, the resolution converter 41 converts the RGB data (for example, 256 gradations) that represents the input image to the setting resolution (for example, 600×1200 dpi) (S102). The color converter 42 converts the RGB data with the setting resolution to CMYK data (for example, 256 gradations) with the same setting resolution (S104). The halftone processor 43 generates the source data 300 with the same setting resolution by performing a halftone process with respect to the CMYK data (S106). The image 325 represented by the source data 300 is a virtual image in which K dots (indicated by the broken line in FIG. 9) also arranged on the dot omission pixel PXL (dot omission region AL) corresponding to the K defective nozzle LN. The source data 300 shown in FIG. 10 is four-value data or is multivalue data in which the large dots are not formed. The complement unit 44 first generates recording portion 309 with the same setting resolution by performing a predetermined vicinity complement process with respect to the source data 300 (S108). The image 326 represented by the recording data 309 is a virtual image that complements the dots to be formed by the K defective nozzle LN with the K dots Dk1 of the neighboring pixels PX1 and PX2 (neighboring regions A1 and A2). The recording data 309 shown in FIG. 10 is four-value data in which the large dot is formed as at least a part of the complementary dot.

It is possible for the vicinity complement process, for example, to be performed in accordance with the following rules. The pixels PXL and PX1 to PX4 in the rules indicate pixels at the same position in the scanning direction D2.

(Rule 1) In a case where the pixels PXL and PX1 of the source data 300 are both "1" (small dot formation) or "2" (medium dot formation), 1 is added to the data of the neighboring pixel PX1, and the dot omission pixel PXL is changed to "0" (no dot). In a case in which the post-complement neighboring pixel PX1 is "3" (large dot formation) and the "2" is stored in the secondary neighboring pixel PX3 of the source data 300, the secondary neighboring pixel PX3 is changed to "1".

(Rule 2) In a case where pixels PXL and PX2 of the source data 300 are both "1" or "2", 1 is added to the data of the neighboring pixel PX2, and the dot omission pixel PXL is changed to "0" (no dot). In a case in which the post-complement neighboring pixel PX2 is "3" and "2" is stored in the secondary neighboring pixel PX4 of the source data 300, the secondary neighboring pixel PX4 is changed to "1".

(Rule 3) In a case in which the dot omission pixel PXL is "1" or "2" and the neighboring pixels PX1 and PX2 are both "0" in the source data 300, the neighboring pixel PX1 is changed to data of the dot omission pixel PXL, and the dot omission pixel PXL is changed to "0".

(Rule 4) In a case where the dot omission pixel PXL of the source data 300 is "0", the data of the pixels PXL and PX1 to PX4 is not changed.

For example, in the source data 300, the dot omission pixel PXL1 is "2" (medium dot formation), and the neighboring pixel PX1 that neighbors the dot omission pixel PXL1 is also "2". In this case, in the recording data 309 passing through the vicinity complement process, the dot omission pixel PXL1 is "0" (no dot), and the neighboring pixel PX1 that neighbors the dot omission pixel PXL1 is "3" (large dot formation). The large dot is a complementary dot changed from a medium dot. The secondary neighboring pixel PX3 that neighbors the neighboring pixel PX1 changes from "2" in the source data 300 to "1" (small dot formation).

In the source data 300, the dot omission pixel PXL2 is "2", and the neighboring pixel PX1 that neighbors the dot omission pixel PXL2 is "0". In this case, in the recording data 309 passing through the complement process, the dot omission pixel PXL2 is "0", and the neighboring pixel PX1 that neighbors the dot omission pixel PXL2 is "2" (medium dot formation). This newly formed medium dot is the complementary dot.

In the source data 300, the dot omission pixel PXL3 is "0", and the neighboring pixel PX1 that neighbors the dot omission pixel PXL3 is "2". In this case, in the recording data 309 passing through the complement process, the dot omission pixel PXL3 is unchanged at "0", and the neighboring pixel PX1 that neighbors the dot omission pixel PXL3 is unchanged at "2".

As outlined above, the recording data 309 is data in which the dot is complemented by the neighboring pixels PX1 and PX2.

Naturally, the technology is not limited to the above-described rules. For example, in Rule 1, the neighboring pixel PX1 is preferably changed to "3", and, in rule 2, the neighboring pixel PX2 is preferably changed to "3".

In a case in which the error arising in the transport of the printing material 400 is an error in which the dots formed on the adjacent secondary neighboring pixels and tertiary neighboring pixels is shifted to the receding side, because the image quality of the printed image 330 is improved, the size of the dots arranged on the secondary neighboring pixels PX3 and PX4 is preferably maintained. The wording "adjacent secondary neighboring pixels and tertiary neighboring pixels" is a combination of the pixels PX3 and PX5 and a combination of pixels PX4 and PX6 in the example in FIG. 2. In the specific example, in a case where the error amount δ in the transport of the printing material 400 is positive as shown in FIG. 8, the dots arranged on the secondary neighboring pixels PX3 and PX4 is preferably made the medium dot Dk3 without change. On the other hand, in a case in which the error arising in the transport of the printing material 400 is an error in which the dots formed on the adjacent secondary neighboring pixels and tertiary neighboring pixels is shifted to the approaching side, because the image quality of the printed image 330 is improved, the size of the dots arranged on the secondary neighboring pixels is preferably decreased.

The complement unit 44 next generates recording data 310 with the same setting resolution by performing a predetermined composite complement process with respect to the recording data 309 (S110). The printed image 330 represented by the recording data 310 is an image in which the CMY dot as the composite black dot Dco is overlapped on the dot omission pixel PXL (dot omission region AL) corresponding to the K defective nozzle LN. The recording data 310 shown in FIG. 10 is four-value data in which the large dot is formed as at least a portion of the complementary dot.

It is possible for the composite complement process to be performed in accordance with the rules in which the data of the K dot omission pixels is added to the data of the corresponding pixel PXLco in the CMY of the recording data 309 in a case in which the K dot omission pixel PXL of the source data 300 is "1" or "2" and the data of the corresponding pixel PXLco is set to "3" in a case of exceeding "3". The corresponding pixels PX1co, PX2 co, PX3co, and PX4co are CMY pixels that correspond to the K pixels PX1, PX2, PX3, and PX4, respectively.

Although the above-described rules are preferably followed, the proportion of ink droplets 67co discharged from the color nozzles 64C, 64M, and 64Y with respect to the dots due to the defective nozzle LN is preferably set to the composite generation ratio Rc according to the amount δ of the error arising in the transport of the printing material 400 in accordance with the composite generation ratio data DA1 shown in the example in FIG. 11. The composite generation ratio Rc is represented by Nco/Nd when the number of K dots due to the defective nozzle LN in a given area on the printing material is Nd and the number of composite black dots generated in the same area is Nco. In FIG. 11, the composite generation ratio Rc is represented as a percentage (Nco/Nd)× 100%, and the error amount |δ| at which Rc=100% is represented by δmax. In a case of forming the composite black dots by forming CMY dots with the same size at a ratio of 1:1:1, any of the C dot generation ratio, the M dot generation ratio, or the Y dot generation ratio is Rc.

The composite generation ratio data DA1 shown in FIG. 11 is regulated by the correspondence ratio in which the composite generation ratio Rc increases the larger the error amount |δ| becomes. The correspondence relationship is preferably a proportional relationship as shown in FIG. 11, or is preferably a relationship deviating from a proportional relationship, such as a relationship that increases in step-wise manner, or a relationship that increases on a curve.

FIG. 11 schematically shows an example of a concept of arranging the composite black dots Dco using random number masks MA1 and Ma2 in a case in which the composite generation ratio Rc is high and a case in which the ratio is low. In either case, the virtual image 327 in which the composite black dots Dco at Rc=100% is added to the virtual image 326 represented by the recording data 309 (refer to FIG. 10) just after the vicinity complement is assumed. Moreover, it is assumed that the printed image 330 is formed by applying the masks MA1 and MA2 to the image 327. The printed image 330 is represented by the recording data 310 as shown in FIG. 10. The masks MA1 and MA2 shown in FIG. 11 include an x mark mask pixel that signifies eliminating the composite black dots Dco, and a non-mask pixel (pixel with no x mark) that signifies composite black dots Dco remaining. That mask MA1 used in a case in which the composite generation ratio Rc is high has a smaller number of mask pixels and a large number of non-mask pixels compared to the mask MA2 used in a case in which the composite generation ratio Rc is low. As a result, in a case in which the error amount |δ| is large, the composite black dots Dco are arranged on the printed image 330 at the high composite generation ratio as shown on the left side of FIG. 11. As a result, in a case in which the error amount |δ| is small, the composite black dots Dco are arranged on the printed image 330 at the low composite generation ratio as shown on the right side of FIG. 11.

Figure 12:
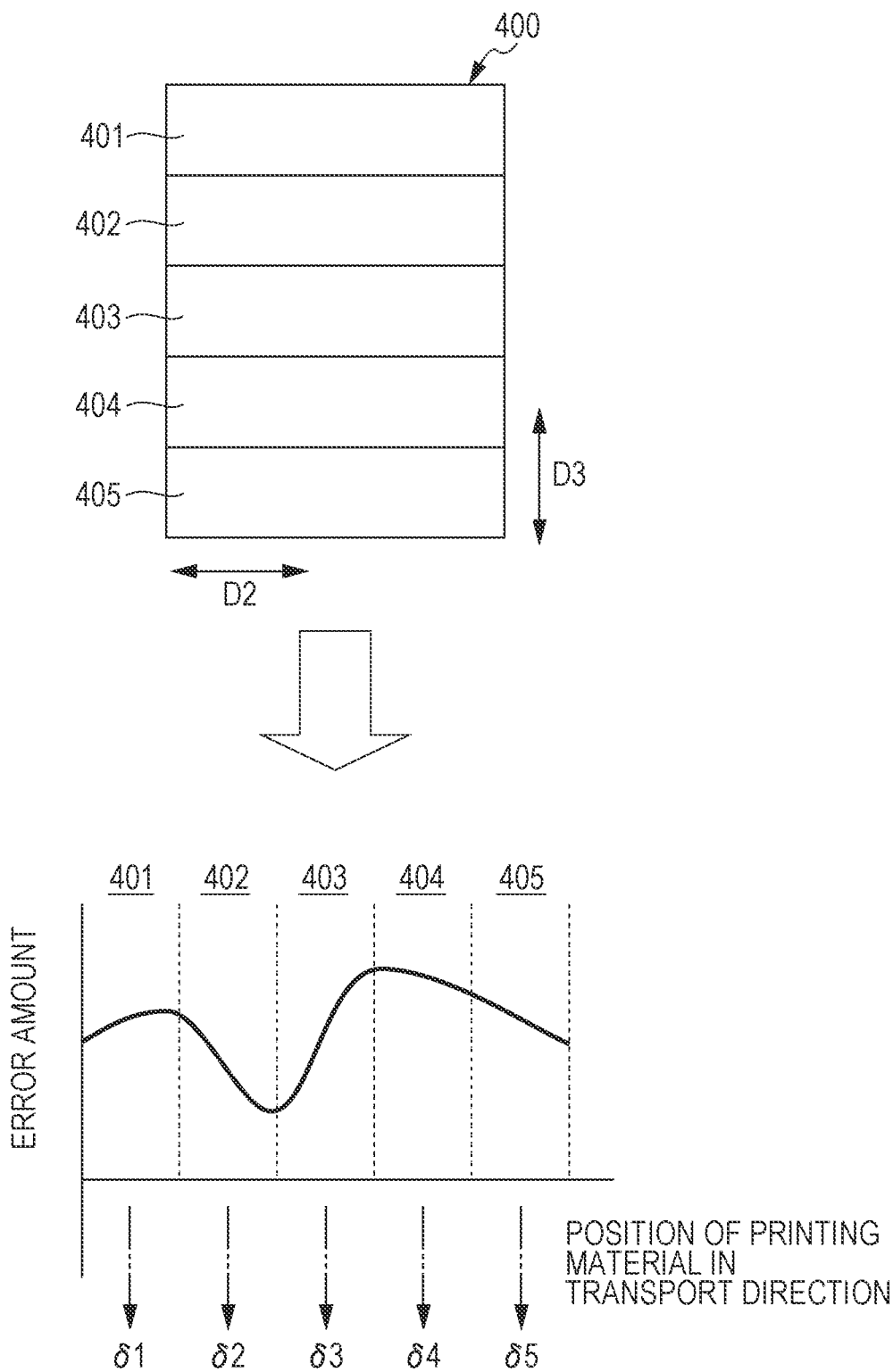
FIG. 12 is a drawing schematically showing an example of setting the error amount for each region of the printing material.

As shown in FIG. 12, the error amount δ is set for each region of the printing material 400, and the composite complement is preferably performed in accordance with the composite generation ratio Rc according to the error amount δ. As shown in FIG. 12, the error amount may change according to the position of the printing material 400 in the transport direction D3. If the region on the printing material is divided into a plurality of regions 401 to 405 in the transport direction D3, and the error amount δ1 to δ5 are obtained for each region by averaging the amount of the error arising in the transport of the printing material 400 for each of regions 401 to 405, it is possible for the composite complement according to the regions 401 to 405 to be performed in accordance with the composite generation ratio Rc according to the error amount δ1 to δ5 for each region. In so doing, coloring and noticeability of stripes in the printed image 330 are effectively suppressed.

The rasterization processor 45 arranges recording data 310 in the order in which the dots are formed by the mechanism unit 50 by performing a predetermined rasterization process with respect to the recording data 310 on which the composite complement is performed, and generates the raster data for each of CMYK (S112). The driving signal transmitter 46 generates the driving signal SG corresponding to the raster data and outputs the signal to the driving circuit 62 of the head 61, and executes printing by driving the driving element 63 according to the raster data and discharging ink droplets 67 from the nozzles 64 of the head 61 (S114). In so doing, a multivalue (for example, four value) printed image expressed by the formation situation of the dots on the printing material 400 is formed, and the printing process ends.

Through the above, as shown as an example in FIGS. 1 and 9, the K dots to be formed on the dot omission pixel PXL are complemented by the composite black dots Dco formed on the dot omission pixel PXL and the K dots Dk1 formed on the neighboring pixels PX1 and PX2. Since the K ink droplets are used for complement, coloring of the stripes along the dot omission pixels PXL that are contiguous in the scanning direction D2 is suppressed, and light stripes due to the composite black are also suppressed. Accordingly, it is possible for the technology to suppress stripes arising in the printed image 330 due to the defective nozzle LN from being noticeable. By referring to the composite generation ratio data DA1 shown in FIG. 11, it is possible for the coloring and noticeability of the stripes in the printed image 330 to be further suppressed according to the error amount δ in the transport of the printing material 400.

(4) DESCRIPTION OF PRINTING PROCESS IN SECOND SPECIFIC EXAMPLE

Figure 13:
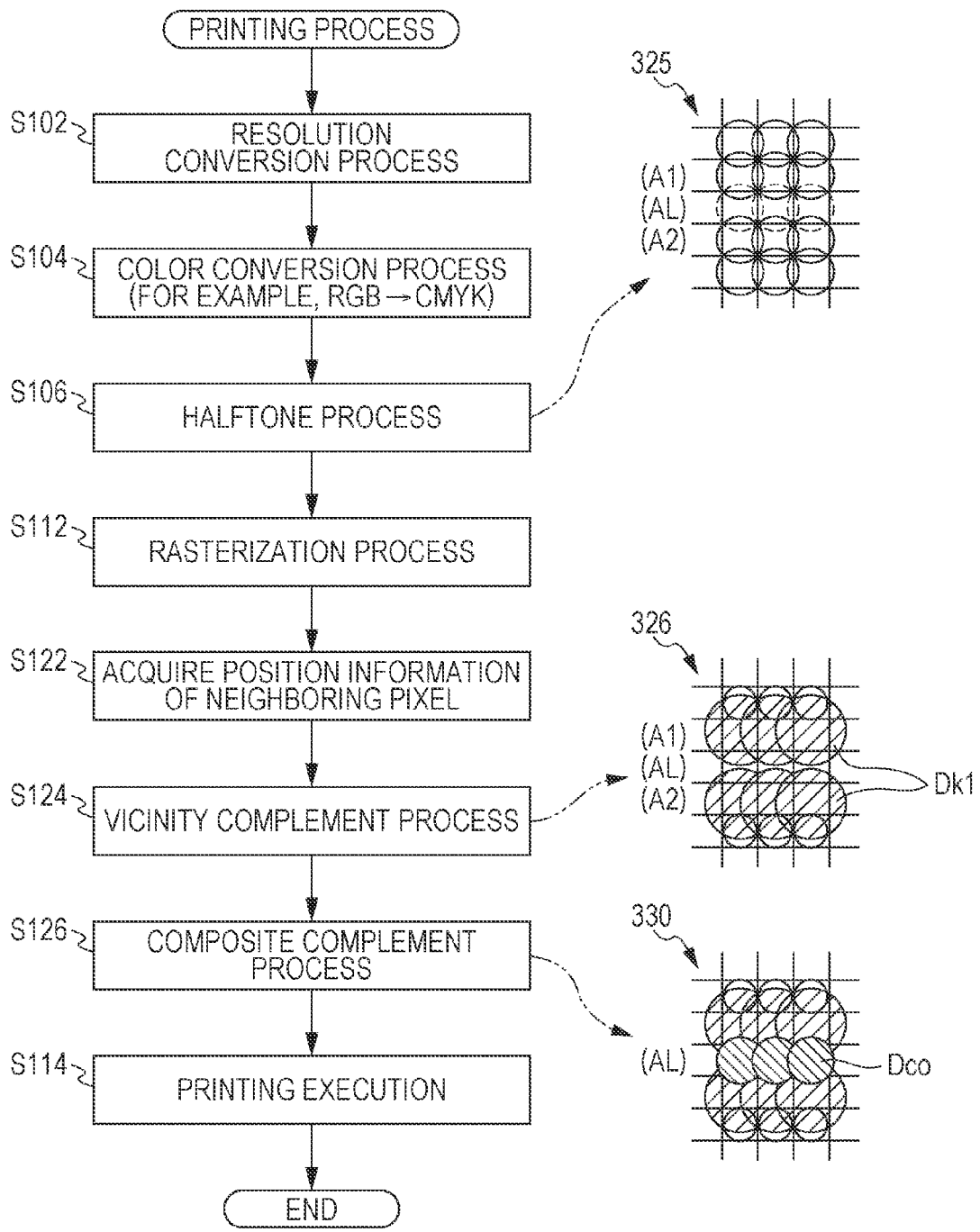
FIG. 13 is a flowchart showing another example of a printing process.

As shown in FIG. 13, it is possible to perform the complement process (S124 and S126) after the rasterization process (S112). The same processes as the processes in FIG. 9 are given the same reference numerals shown in FIG. 9 and detailed description thereof will not be made.

When the printing process is started, the controller 10 first performs the resolution conversion process, the color conversion process and the halftone processing (S102 to S106), and generates the source data 300 that represents the virtual image 325 in which K dots are also arranged on the dot omission region AL. The rasterization processor 45 arranges source data 300 in the order in which the dots are formed by the mechanism unit 50 by performing a predetermined rasterization process with respect to the source data 300, and generates the raster data for each of CMYK (S112).

In a case of performing interlace printing, the multivalue data of the position that neighbors the dot omission pixel PXL in the transport direction D3 in the raster data is multivalue data of the pixel separated from the dot omission pixel PXL, rather than multivalue data of the neighboring pixels PX1 and PX2 that neighbor the dot omission pixel PXL in the printed image 330. In the example shown in FIG. 5, in a case in which the dot omission pixel PXL is at the position of the dot circle 5, the multivalue data of the neighboring position in the transport direction D3 in the raster data is multivalue data representing the circle 4 and circle 6 dots. However, in forming on the actual neighboring pixels PX1 and PX2, the dot circle 3 is formed on the pass after the pass that forms the dot circle 5 and the dot circle 7 is formed on the pass immediately before the pass that forms the dot circle 5. The complement unit 44 first acquires the position information of the neighboring pixels PX1 and PX2, such as if the neighboring pixels PX1 and PX2 are pixel on which a dot is formed by which number nozzle on which pass in the raster data (S122).

The complement unit 44 next performs the predetermined vicinity complement process with respect to the source data 300 using the position information of the neighboring pixels PX1 and PX2 (S124). The raster data immediately after vicinity complement is data that represents the virtual image 326 that complements the dots to be formed due to the K defective nozzle LN with the K dots Dk1 of the neighboring regions A1 and A2. It is possible for the vicinity complement process to be performed in accordance with the rules shown in the first specific example.

The complement unit 44 further performs the predetermined composite complement processing with respect to the raster data after vicinity complement (S126). The raster after composite complement is data the represents the printed image 330 in which CMY dots as composite black dots Dco are overlapped on the dot omission region AL corresponding the to the K defective nozzle LN. It is possible for the composite complement process to be performed in accordance with the rules in which the data of the K dot omission pixels is added to the data of the corresponding pixel in the CMY of the raster data in a case in which the K dot omission pixel PXL of the source data 300 is "1" or "2" and the data of the corresponding pixel is set to "3" in a case of exceeding "3". The proportion of ink droplets 67co discharged from the color nozzles with respect to the dots due to the defective nozzle LN is preferably set to the composite generation ratio Rc according to the amount δ of the error arising in the transport of the printing material 400 in accordance with the composite generation ratio data DA1 shown in the example in FIG. 11. As shown in FIG. 12, the composite complement is preferably performed in accordance with the composite generation ratio Rc according to the error amount δ set for each region of the printing material 400.

The driving signal transmitter 46 generates the driving signal SG corresponding to the raster data after composite complement and outputs the signal to the driving circuit 62 of the head 61, and executes printing by driving the driving element 63 according to the raster data and discharging ink droplets 67 from the nozzles 64 of the head 61 (S114). In so doing, a multivalue (for example, four value) printed image expressed by the formation situation of the dots on the printing material 400 is formed, and the printing process ends.

Also according to the above, as shown as an example in FIGS. 1 and 13, since the vicinity complement is performed with both the composite complement and the K dots Dk1, coloring of stripes along the dot omission pixels PXL contiguous in the scanning direction D2 is suppressed, and light stripes due to the composite black are also suppressed. Accordingly, it is possible for the technology to suppress stripes arising in the printed image 330 due to the K defective nozzle LN from being noticeable.

(5) DESCRIPTION OF PRINTING PROCESS IN THIRD SPECIFIC EXAMPLE

Figure 14:
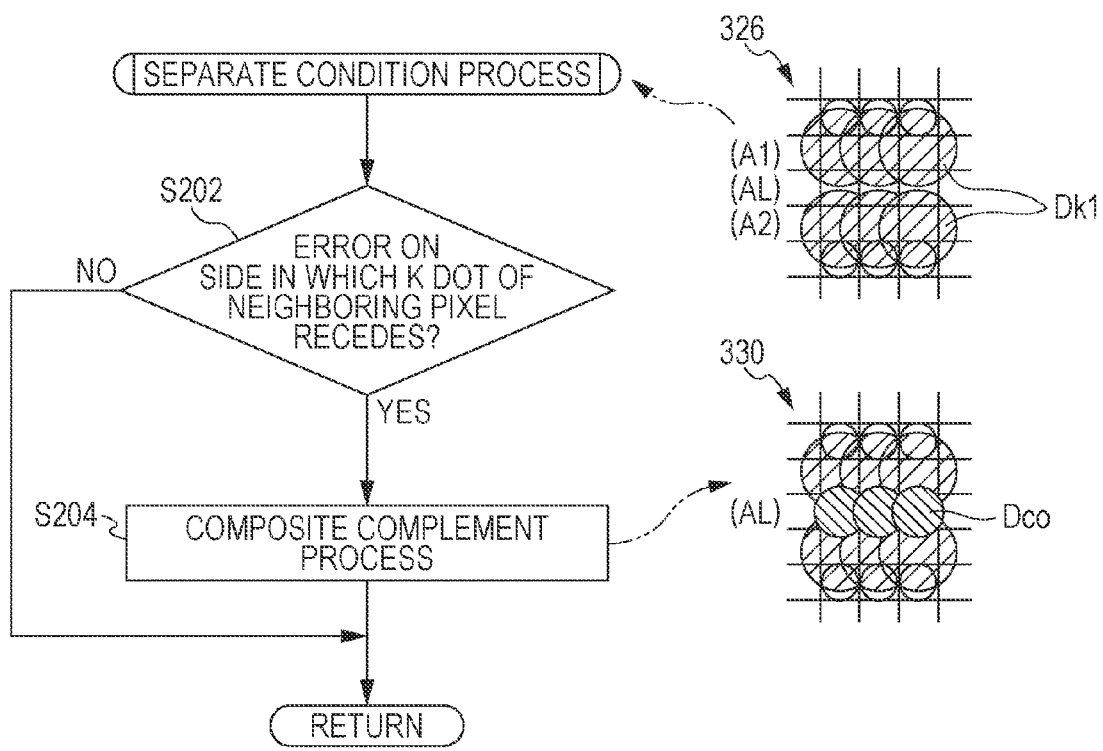
FIG. 14 is a flowchart showing an example of condition-based processing.

As shown in FIG. 14, the condition-based processing is preferably performed instead of the composite complement process (S110 and S126) in FIGS. 9 and 13. When the condition-based processing is started, the complement unit 44 determines whether or not an error in which the K dots Dk formed on the dot omission pixel PXL and the neighboring pixels PX1 and PX2 arises in the transport of the printing material 400 (S202), performs the composite complement process when the conditions are fulfilled (S204) and does not perform the composite complement process when the conditions are unfulfilled.

For example, in a case where the error amount δ is negative as shown in FIG. 1, if the defective nozzles LN are the nozzles circle 3, circle 5, and circle 4, the dots formed on the dot omission pixel PXL and the neighboring pixel PX1 recede, and the dots formed on the dot omission pixel PXL and the neighboring pixel PX2 also recede, compared to when δ=0. If the defective nozzles LN are the nozzles circle 1 and circle 2, even though the dots formed on the dot omission pixel PXL and the neighboring pixel PX1 approach, the dots formed on the dot omission pixel PXL and the neighboring pixel PX2 recede. If the defective nozzles LN are the nozzles circle 7 and circle 6, even though the dots formed on the dot omission pixel PXL and the neighboring pixel PX2 approach, and the dots formed on the dot omission pixel PXL and the neighboring pixel PX1 recede. Accordingly, in either case, it can be said that an error in which the dots Dk formed on the dot omission pixel PXL and the neighboring pixels PX1 and PX2 arises in the transport of the printing material 400 is shifted to the receding side. In a case where δ<0, the composite complement process in S204 is preferably performed without conditions.

Meanwhile, in a case where the error amount δ is positive as shown in FIG. 8, if the defective nozzles LN are the nozzles circle 3, circle 5, and circle 4, the dots formed on the dot omission pixel PXL and the neighboring pixel PX1 approach, and the dots formed on the dot omission pixel PXL and the neighboring pixel PX2 also approach, compared to when δ=0. If the defective nozzles LN are the nozzles circle 1 and circle 2, even though the dots formed on the dot omission pixel PXL and the neighboring pixel PX1 recede, the dots formed on the dot omission pixel PXL and the neighboring pixel PX2 approach. If the defective nozzles LN are the nozzles circle 7 and circle 6, even though the dots formed on the dot omission pixel PXL and the neighboring pixel PX2 recede, the dots formed on the dot omission pixel PXL and the neighboring pixel PX1 approach. Here, as a consideration, in a case where δ>0, the complement unit 44 preferably ends the condition-based processing without performing the composite complement process of S204. If the nozzle (circle 1, circle 2, circle 6, and circle 7) in which an error in which the dots formed on one of the dot omission pixel PXL and the neighboring pixels PX1 and PX2 are shifted to the receding side is the defective nozzle LN in a case where δ>0, the complement unit 44 preferably performs the composite complement process of S204. Meanwhile, if the nozzle (circle 3, circle 4, circle 5) in which any of the dots formed on one of the dot omission pixel PXL and the neighboring pixels PX1 and PX2 are shifted to the approaching side is the defective nozzle LN in a case where δ>0, the complement unit 44 ends the condition-based processing without performing the composite complement process of S204.

Since the composite complement is not performed in a case in which an error arising in the transport of the printing material 400 is an error such that stripes in the printed image 330 are not noticeable in the specific example, coloring or noticeability of stripes in the printed image 330 is effectively suppressed.

(6) DESCRIPTION OF PRINTING PROCESS IN FOURTH SPECIFIC EXAMPLE

Figure 15:
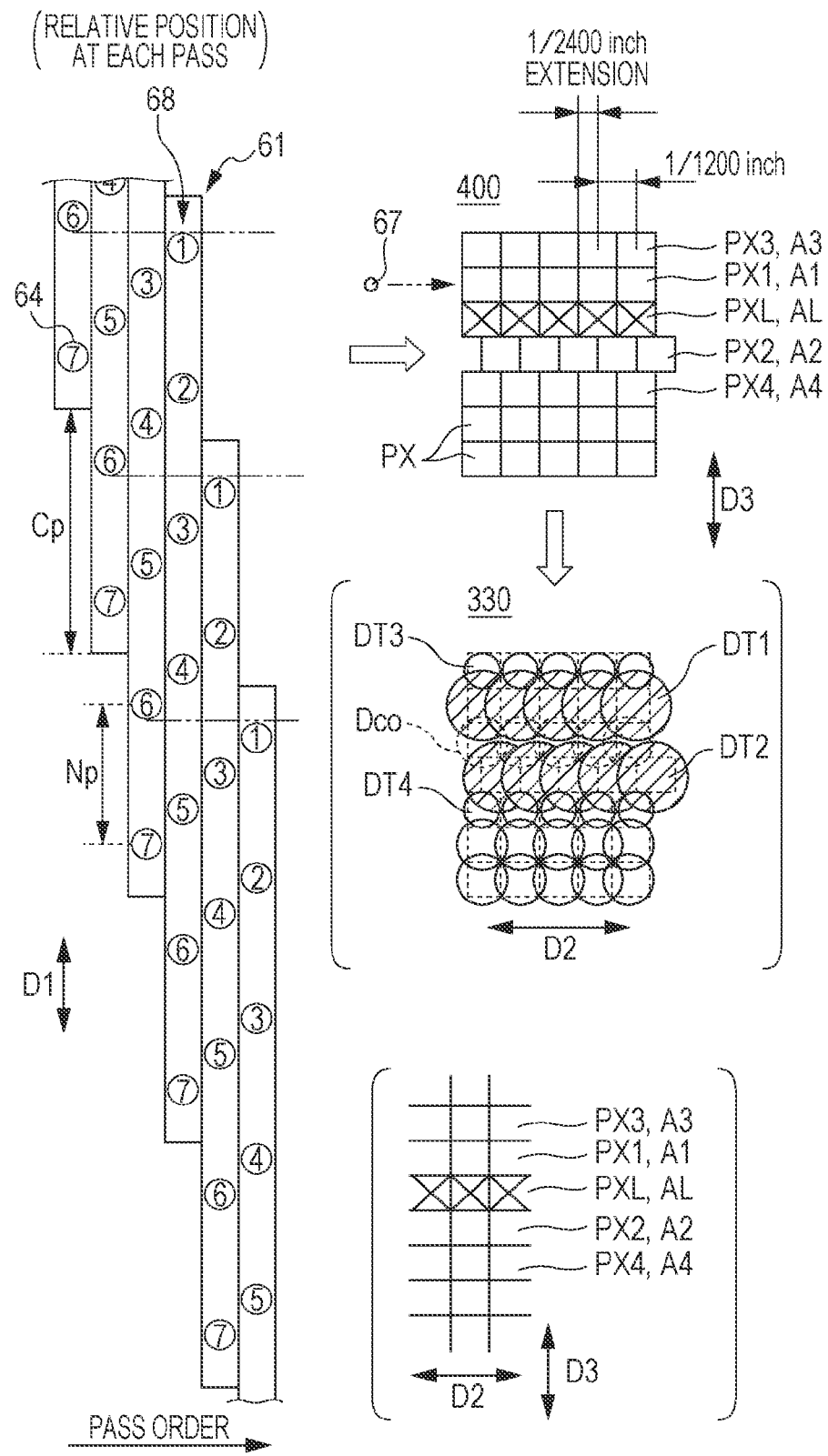
FIG. 15 is a drawing schematically showing an example forming an image by shifting positions of dots of neighboring regions in the scanning direction.

The fourth specific example shown in FIG. 15 forms a printed image 330 by shifting the positions in the scanning direction D2 of dots in both the neighboring regions A1 and A2. The meaning of "shifting the positions in the scanning direction D2 of dots in both the neighboring regions A1 and A2" will be described with reference to FIG. 16.

Figure 16:
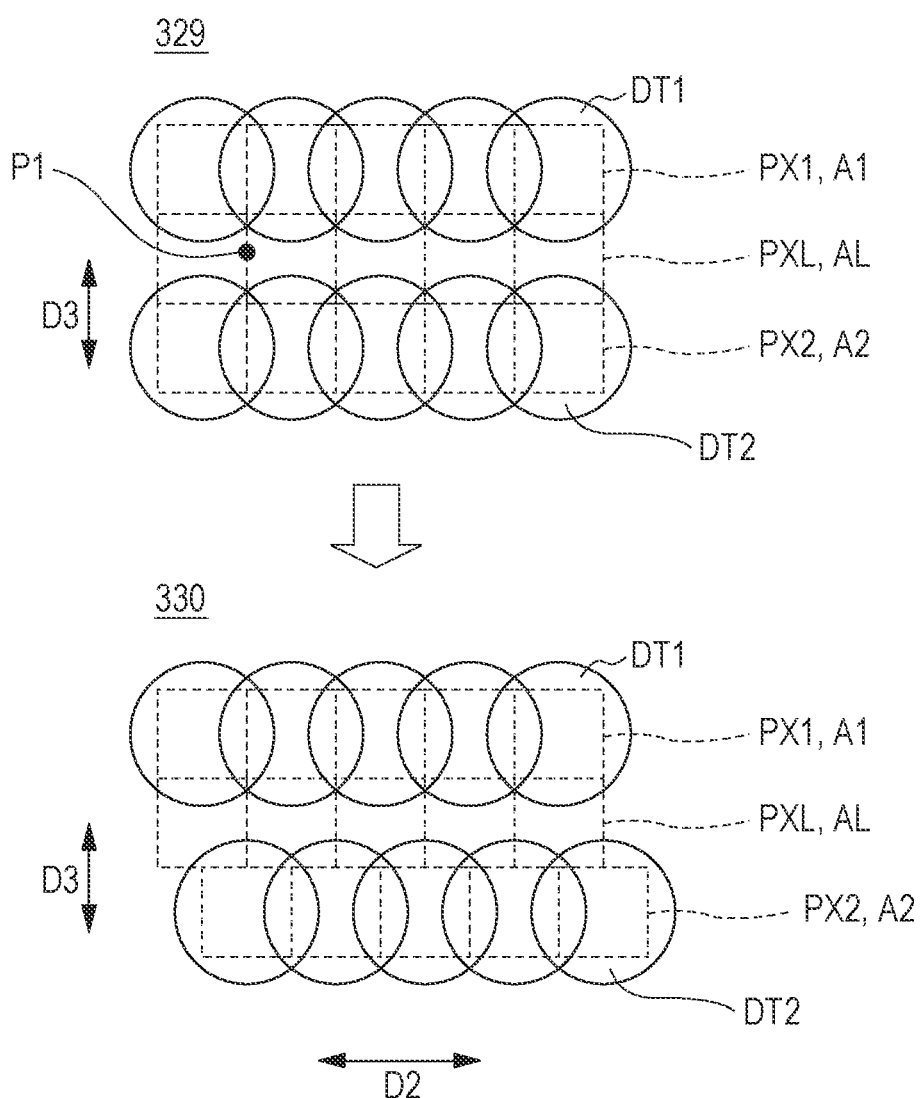
FIG. 16 is a drawing schematically showing an example of the appearance stripes when positions of dots of neighboring regions are shifted in the scanning direction.

FIG. 16 schematically shows an example of the appearance of stripes when positions of dots of neighboring regions A1 and A2 are shifted in the scanning direction D2. On the upper side of FIG. 16, the appearance of stripes (dot omission region AL) in the image 329 in which the positions of the dots DT1 and DT2 are not shifted in the scanning direction D2 is shown, and, on the lower side of FIG. 16, the appearance of stripes (dot omission region AL) in the image 330 in which the positions of the dots DT1 and DT2 are shifted by ½ pixel in the scanning direction D2. Although the composite black dots Dco are formed on the dot omission region AL, the composite black dots are not depicted in FIG. 16 for ease of comprehension.

When the pixels that configure the image are the predetermined landing position of the ink droplets, the position of the dot omission pixel PXL in the scanning direction D2 and the positions of the neighboring pixels PX1 and PX2 are the same in the image 329 shown on the upper side of FIG. 16. In the case of the image 329, locations P1 with a wide gap and locations with a narrow gap arise between the dots DT1 and DT2 of the neighboring regions A1 and A2. When a location P1 with a wide gap is present, the stripes are comparatively easily observed.

Meanwhile, in the image 330 shown on the lower side of FIG. 16, the position of the dot omission pixel PXL and the first neighboring pixel PX1 in the scanning direction D2 are the same, and the position of the dot omission pixel PXL and the second neighboring pixel PX2 in the scanning direction D2 are different to one another. In the case of the image 330, the gap between the dots DT1 and DT2 of the neighboring regions A1 and A2 become more uniform than the image 329. When location with the widest gap in the image 330 is narrower than the location P1 with a wide gap in the image 329, the stripes are comparatively difficult to observe. Even when the composite black complementary dots are formed on the dot omission region AL, coloring or noticeability of the stripes is suppressed.

When the positions of the dots on the neighboring regions A1 and A2 are shifted in the scanning direction D2, the positions of the first neighboring pixel PX1 and the dot omission pixel PXL are preferably the same, the positions of the second neighboring pixel PX2 and the dot omission pixel PXL are preferably the same, or the positions of both neighboring pixels PX1 and PX2 and the dot omission pixel PXL are preferably shifted. If the neighboring pixels PX1 and PX2 are shifted, even though less than one pixel is preferable, and ½ the pixel pitch, for example, ½₄₀₀ inch if the resolution is 1200 dpi is particularly preferable, there is no limitation to ¼ to ⅓ the pixel pitch or the like, or ½ the pixel pitch.

Figure 17:
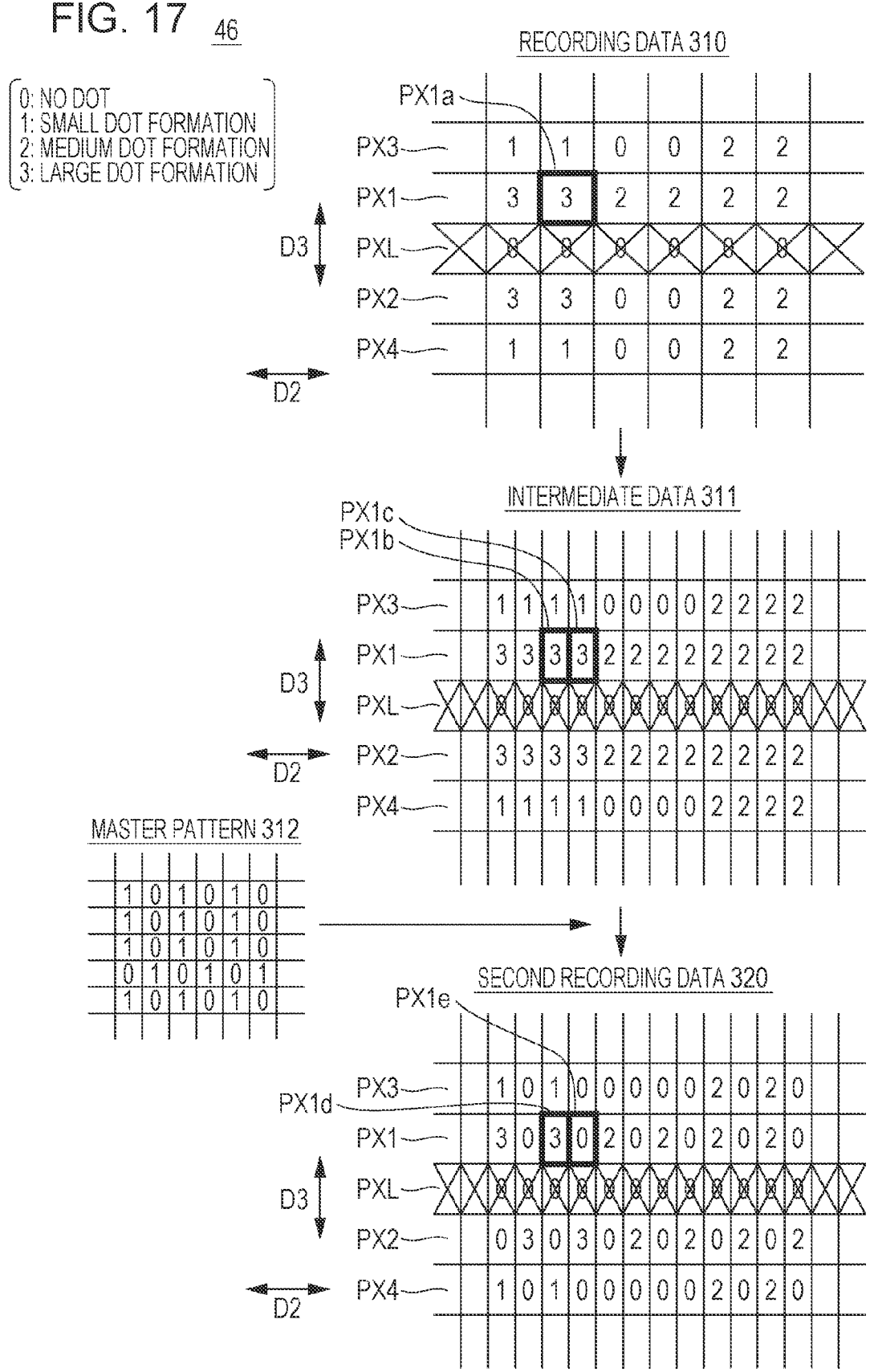
FIG. 17 is a drawing schematically showing the flow of a data conversion process.

FIG. 17 is schematically shows an example of the flow of a data conversion process performed by the driving signal transmitter 46. The recording data 310 that is the first resolution (for example, 1200 dpi) in the scanning direction D2 is generated by the processing of the respective portions 41 to 45 described above, as an assumption of the data conversion process.

The driving signal transmitter 46 first generates intermediate data 311 in which four-value data for each pixel in the recording data 310 by two pixels being contiguous in the scanning direction D2 and converted to a second resolution (for example, 2400 dpi) that is a multiple of the first resolution in the scanning direction D2, based on the recording data 310. In a case in which the pixel PX1$a$ of the recording data 310 with 1200 dpi in the scanning direction is "3" (large dot formation), the two contiguous pixels PX1$b$ and PX1$c$ in the intermediate data 311 with 2400 dpi in the scanning direction are "3".

The driving signal transmitter 46 generates second recording data 320 with 2400 dpi in the scanning direction D2 in which data of each pixel (each source pixel) of the recording data 310 is arranged for every other pixel in the scanning direction D2 and data in which dots are not formed on the remaining pixels is arranged by taking the logical product of mask pattern 312 of the data array in which the data of neighboring pixels PX1 and PX2 are shifted from one another and the intermediate data 311. The mask pattern 312 is pattern data in which values in which "1" and "0" are alternately arranged on pixels that form an orderly line in the scanning direction D2, and the second neighboring pixel PX2 and the remaining pixel on the pixels that form an orderly line in the transport direction D3 are different to each other are stored. That is, the values of the neighboring pixels in the scanning direction D2 are different from one another, and if the second neighboring pixel PX2 in the transport direction D3 is "1", the remaining pixel is "0", and if the second neighboring pixel PX2 is "0", the remaining pixel is "1". Here, "1" signifies data of superimposed pixels in the intermediate data 311 remaining, and "0" signifies superimposed pixels in the intermediate data 311 are "0". Naturally, the mask pattern 312 is preferably pattern data in which values in which the first neighboring pixel PX1 and the remaining pixel on the pixels that form an orderly line in the transport direction D3 are stored.

In a case where the neighboring pixels PX1$b$ and PX1$c$ in the intermediate data 311 is "3", the neighboring pixel PX1$b$ at the position on which dots are first formed in the intermediate data 311 remains "3" and the neighboring pixel PX1$d$ of the second recording data 320 is "3". The neighboring pixel PX1$c$ at a position on which the dots are formed afterwards in the intermediate data 311 is converted to "0", and the neighboring pixel PX1$e$ of the second recording data 320 is "0".

As described above, the driving signal transmitter 46 arranges data of each pixel in the recording data 310 for every other pixel in the scanning direction D2 and arranges data on which the dots are not formed on the remaining pixel based on the recording data 310, and generates second recording data 320 with 2400 dpi in the scanning direction by shifting the positions of the data of each pixel in the recording data 310 in the neighboring pixels PX1 and PX2 with each other. The driving signal transmitter 46 generates the driving signal SG form the second recording data 320 and outputs the signal to the driving circuit 62. Here, because the pitch of the dots in the scanning direction D2 corresponds to changing from ¹⁄₁₂₀₀ dpi to ½₄₀₀ dpi, the movement speed of the head 61 is halved compared to a case of 1200 dpi. In so doing, ink droplets are discharged from the plurality of nozzles 64 in accordance with the second recording data 320 with 2400 dpi in the scanning direction without changing the circuit that generates the printing timing at which the discharge interval of the ink droplets from the nozzles 64 is determined, and thus the dots are formed.

With the above processing, since the positions in the scanning direction d2 of the dots DX1 and DX2 of the neighboring regions A1 and A2 as shown in FIG. 15 are shifted, the location P1 with a wide gap as in the image 329 shown in FIG. 16 is eliminated. Accordingly, it is possible for the specific example to suppress coloring or noticeability of the stripes when the composite black complementary dots are formed on the dot omission region AL.

Because the position in the scanning direction D2 of the dots DX1 and DX2 in the neighboring regions A1 and A2 are shifted, the timing of the printing timing signal supplied to the driving circuit 62 (refer to FIG. 3) corresponding to the first neighboring pixel PX1 and the timing of the printing timing signal supplied to the driving circuit 62 corresponding to the second neighboring pixel PX2 are preferably shifted.

If the driving waveform supplied to the driving element 63 is changeable, it is possible for the positions in the scanning direction D2 of the dots DX1 and DX2 in the neighboring regions A1 and A2 to be shifted by changing the speed of the ink droplets discharged from the nozzles corresponding to the first neighboring pixel PX1 and the speed of the ink droplets discharged from the nozzles corresponding to the second neighboring pixel PX2.

(7) MODIFICATION EXAMPLE

Various modification examples of the invention are considered.

The ink jet printer to which the technology is applicable also includes a copy machine, facsimile and the like, in addition to the serial printer. The technology is also applicable to a printer that performs band printing by intermittently transporting the printing material by a length unit in the transport direction of the nozzle row.

The ink is not merely a fluid that expresses a color, and various liquids that impart some function, such as colorless fluids that express a glossy feeling, are included. Accordingly, the ink droplets include various liquid droplets, such as colorless droplets.

Even in an ink jet printer not provided with a defective nozzle detector U3, the basic effects of the technology are obtained.

(8) CONCLUSION

As in the above description, according to the various forms according to the invention, it is possible to provide a technology or the like able to further suppress stripes arising in a printed image due to a defective nozzle in which the formation of a black dot is defective from being noticeable. Naturally, even in a technology or the like with only the constituent features according to the independent aspects without having the constituent features of the dependent aspects, the above-described basic actions and effects are obtained.

Configurations in which each configuration disclosed in the above-described embodiments and modification examples are substituted or combined with one another, and configurations in which a known technology and the configurations disclosed in the above-described embodiments and modification examples are substituted or combined with one another, and the like are also able to be achieved. The invention also includes these configurations.

What is claimed is:

1. A recording method in which a plurality of black nozzles that discharge black ink droplets are lined up in an arrangement direction different than a scanning direction, and a nozzle row group in which a plurality of color nozzles that discharge color ink droplets are lined up in the arrangement direction, comprising:
    depositing ink droplets on a printing material to form a printed image; and
    performing a composite complement process for dot omission pixels that are in the scanning direction due to defective nozzles among the plurality of black nozzles by discharging color ink droplets that form composite black dots from the color nozzles; and
    performing a vicinity complement process in which black ink droplets that form black dots for complement are discharged from the black nozzles to neighboring pixels that neighbor the dot omission pixels in a direction that intersects the scanning direction along with the composite complement process.

2. The recording method according to claim 1,
wherein the printed image is formed by discharging ink droplets from a nozzle row group by the printing material being transported in a transport direction that intersects the scanning direction, and the nozzle group being moved in the scanning direction; and
a proportion of ink droplets discharged from color nozzles with respect to dots due to the defective nozzles is proportioned according to the amount of error arising in the transport of the printing material.

3. The recording method according to claim 2,
wherein the proportion of the ink droplets discharged from the color nozzle with respect to dots due to the defective nozzles increases the larger the amount of error arising in the transport of the printing material becomes.

4. The recording method according to claim 1,
wherein the printed image is formed by discharging ink droplets from the nozzle row group by the printing material being transported in the transport direction that intersects the scanning direction and the nozzle row group being moved in the scanning direction,
composite black dots for complement are formed on the dot omission pixel in addition to black dots for complement on the neighboring pixels in a case in which an error in which black dots formed at the dot omission pixel and the neighboring pixels are shifted to a receding side arises in the transport of the printing material; and
black dots for complement are formed in the neighboring pixels, whereas composite black dots for complement are not formed in the dot omission pixels in a case in which an error in which black dots formed on the dot omission pixel and the neighboring pixel are shifted to an approaching side arises in the transport of the printing material.

5. The recording method according to claim 1,
wherein a first neighboring pixel and a second neighboring pixel at mutually opposite sides from the dot omission pixel are included in the neighboring pixel, and
the position in the scanning direction of the black dot formed by the ink droplet from the black nozzle with respect to the first neighboring pixel and the position in the scanning direction of the black dot formed by the ink droplet from the black nozzle with respect to the second neighboring pixel are shifted.

6. The recording method according to claim 1,
wherein the printed image is formed by interlace printing that discharges ink droplets from the nozzle row group by repeating transport of the printing material in a transport direction that intersects the scanning direction and the nozzle row group being moved in the scanning direction.

* * * * *